United States Patent [19]

Andow et al.

[11] Patent Number: 4,541,058
[45] Date of Patent: Sep. 10, 1985

[54] PROTECTIVE RELAY SYSTEM

[75] Inventors: Fumio Andow; Mitsuru Yamaura; Ryotaro Kondow, all of Tokyo, Japan

[73] Assignee: Tokyo Shibaura Denki Kabushiki Kaisha, Kawasaki, Japan

[21] Appl. No.: 419,473

[22] Filed: Sep. 17, 1982

[30] Foreign Application Priority Data

Sep. 30, 1981 [JP] Japan .................................. 56-153567

[51] Int. Cl.³ .......................... G01R 19/00; H02H 3/26
[52] U.S. Cl. ..................................... 364/483; 307/126; 361/79; 364/550; 364/184
[58] Field of Search ............... 364/480, 481, 483, 550, 364/579, 184; 324/415, 424, 83 R, 83 A, 83 D, 51, 52; 361/42, 44, 47, 79, 85, 94; 307/116, 126; 328/154

[56] References Cited

U.S. PATENT DOCUMENTS

| | | | |
|---|---|---|---|
| 4,161,011 | 7/1979 | Wilkinson | 361/85 X |
| 4,300,182 | 11/1981 | Schweitzer, III | 361/79 |
| 4,330,778 | 5/1982 | Yamazaki et al. | 324/83 D X |
| 4,420,805 | 12/1983 | Yamaura et al. | 361/79 X |

OTHER PUBLICATIONS

"Microprocessor Based Digital Relays Application in Tepco", IEEE PES Winter Meeting, 81 WM 119-7, Feb. 1-6, 1981.

Primary Examiner—Edward J. Wise
Assistant Examiner—Kevin J. Teska
Attorney, Agent, or Firm—Oblon, Fisher, Spivak, McClelland & Maier

[57] ABSTRACT

A protective relay system for protecting a power system includes a selection circuit, a comparing circuit, and a data processing unit. The selection circuit time-sequentially switches a plurality of input signals having electrical quantities from the power system under control of the data processing unit and applies the input signals to the comparing circuit. The comparing circuit applies to the data processing unit a discriminated output signal representing the result of the comparing of a level of a signal having an electrical quantity and obtained from the input signals to the comparing circuit with a reference level. At a time point upon lapse of a time corresponding to an electrical angle of 90° of the input signal, for example, after the logical level of a first discriminated output signal corresponding to a first controlled state of the selection circuit has been changed, the comparing circuit produces a second discriminated output signal corresponding to a second controlled state of the selection circuit different from the first controlled state. The data processing unit determines the level of a protection output signal according to a logical level of the second discriminated output signal.

14 Claims, 27 Drawing Figures

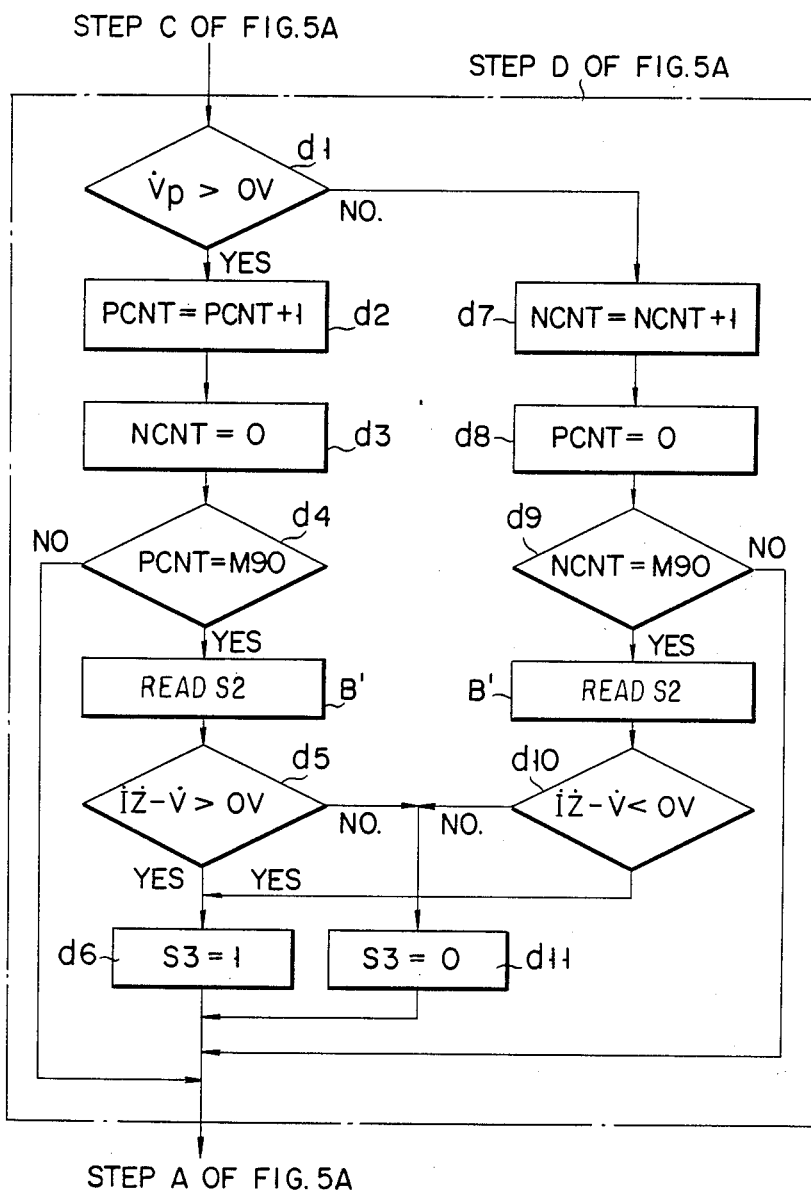

PROTECTIVE RELAY SYSTEM

BACKGROUND OF THE INVENTION

1. Field of the Invention

The present invention relates to a protective relay system with a digital data processing unit for protecting power transmission lines, for example.

2. Description of the Prior Art

An example of a prior art static type mho relay as shown in FIG. 1 will first be described to explain the problems involved in the prior art. In the figure, CT designates a current transformer for transforming current $\dot{I}'$, flowing through the power transmission line TL, to be protected, into a current $\dot{I}$. The current $\dot{I}$ is converted into a resultant vector $\dot{I}Z$ as the product of the current $\dot{I}$ and a replica impedance $\dot{Z}$ simulated with respect to the line impedance of the transmission line TL by a converting circuit IM. The resultant vector $\dot{I}Z$ is applied to the (+) input terminal of a first comparator 1. PT is a potential transformer for transforming the voltage $\dot{V}'$ on the BUS into a voltage $\dot{V}$. The transformed voltage $\dot{V}$ is supplied to the (−) input terminal of the first comparator 1 and a series resonant circuit RC. The series resonant circuit RC is for storing the voltage $\dot{V}$ of two or three cycles before a fault occurs in the transmission line at the closest possible point to the fault. The output voltage $\dot{V}_p$ of the resonant circuit RC will be referred to as a polarity voltage and is supplied to the (+) input terminal of a second comparator 2. The (−) input terminal of the second comparator 2 is kept at a substantially zero potential. This zero potential may be a voltage minutely DC biased in order to secure a stable operation of the relay under a no input condition. The output signals $S(\dot{I}Z-\dot{V})$ and $S(\dot{V}_p)$ of the first and second comparators 1 and 2 represent the phases of the signals $(IZ-\dot{V})$ and $V_p$, respectively. The signals $S(IZ-\dot{V})$ and $S(V_p)$ are compared in phase with each other by an AND circuit 3. The output signal from the AND circuit 3 is applied to a time duration measuring circuit 4 for measuring the time duration of the output signal from the AND circuit 3 as to whether it exceeds a given value, for example, that corresponding to an electrical angle of 90°.

When the mho relay shown in FIG. 1 is used for a short circuit distance relay installed between the R and S phases of three phase transmission lines, an electrical quantity $\dot{I}$ is replaced by $(\dot{I}_R - \dot{I}_S)$ as a vector difference between the R- and S-phase currents $\dot{I}_R$ and $\dot{I}_S$ and another electrical quantity $\dot{V}$ is replaced by the R-S line voltage $\dot{V}_{RS}$.

Assume now that an R-S short fault takes place in the operating range of the mho relay on the power transmission line TL. In this case, the time duration of a logical "1" state produced from the AND circuit 3 exceeds a setting time duration of the time duration measuring circuit 4. As a result, the circuit 4 produces a protection output signal "1" allowing the circuit breaker to trip. On the other hand, when such a fault takes place outside the operating range of the mho relay, the circuit 4 produces no protection output signal "1".

FIG. 2 shows a vector diagram illustrating a characteristic of the above-mentioned mho relay. As seen, when an angle $\theta$ defined by vectors $(\dot{I}Z-\dot{V})$ and $\dot{V}_p$ is within 90°, the relay operates or produces the protection output signal "1". For protecting three phase transmission lines by the above-mentioned protective relays, three relays with the same structure and characteristic must be used.

For expanding the operating range of the mho relay (or increasing the replica impedance) when the mho relay is used to protect power transmission lines, the load impedance $\dot{Z}$ may be contained in the operating range of the relay. This is undesirable. This undesirable phenomenon can be avoided by using a combination of the mho relay and a blinder relay with an ohm characteristic. The characteristic of the blinder relay is illustrated in FIG. 3. The blinder relay operates when an angle $\theta$ defined by the vectors $(\dot{I}Z_r-\dot{V})$ and $\dot{I}Z_R$ is within 90° to produce the protection output signal. The basic construction of the blinder relay is the same as that of the mho relay when vectors $\dot{I}Z$ and $\dot{V}_p$ are replaced by vectors $\dot{I}Z_r$ and $\dot{I}Z_R$, respectively.

As described above, in the prior art protective relay system, there are drawbacks that the protective relays constituting individual circuits with the same or similar arrangements must be provided for the respective phases in the power system to be protected in a one-to-one correspondence manner. The result is that the protective relay system is bulky.

SUMMARY OF THE INVENTION

Accordingly, an object of the present invention is to provide a protective relay system which can be simplified in construction by adapting an arrangement in which the major portions of the individual protective relays with the same or similar circuit arrangements are used in common for the respective phases in the power system to be protected.

According to the present invention, there is provided a protective relay system comprising a selection circuit means for selectively conducting at least one input signal to produce at least one output signal; comparing means connected to the selection circuit means for receiving the output signal from the selection circuit means to discriminate whether the output signal is within a predetermined range or not, and to produce at least one discriminated output signal in accordance with the discrimination; and data processing means connected to the comparing means for receiving the discriminated output signal from the comparing means to generate at least one protection output signal. The data processing means includes means for controlling the selection circuit means to time-sequentially change the output signals from the selection circuit means; means for reading the discriminated output signal from the comparing means into a specified processing step in the data processing means corresponding to a controlled state of the selection circuit means; and means for determining the logical level of the protection output signal in accordance with the logical level of a second discriminated output signal from the comparing means corresponding to a second controlled state different from a first controlled state of the selection circuit means. The second discriminated output signal is produced upon the lapse of a predetermined time after the logical level of a first discriminated output signal from the comparing means corresponding to the first controlled state of the selection circuit means has been changed.

With such an arrangement, a signal having an electrical quantity $\dot{V}$ in the first controlled state of the selection circuit means is supplied to the comparing means, and in the second controlled state, signals having electrical quantities $\dot{I}Z$ and $\dot{V}_p$ are supplied to the comparing circuit means. A time point, that a logical level of a first discriminated output signal from the comparing means corresponding to the electrical quantity $\dot{V}$ changes from "1" to "0" or "0" to "1", is used as a reference time point. A second discriminated output signal in logical "1" or "0" is supplied to the data processing means from the comparing means according to the second controlled state upon a lapse of a predetermined time, e.g. a time duration corresponding to an electrical angle of 90° of the electrical quantity $\dot{V}$, for example, from the reference time point. The data processing means determines the logical level of the protection output signal corresponding to the logical level of the second discriminated output signal at the second controlled state.

According to the present invention, when the power system to be protected is of the single phase type, the electrical quantities corresponding to the single phase are supplied to the selection circuit means to cause the data processing means to produce a protection output signal corresponding to the single phase. When the power system to be protected is of the multiphase type, electrical quantities corresponding to the multiphase system are supplied to the selection circuit means to cause the data processing means to produce protection output signals for the multiphase power system. Further, protection output signals corresponding to different characteristics may be produced from a single data processing means. With these inventive technical features, the protective relay system may be scaled down, the number of parts necessary for the relay system can be reduced, the reliability of the relay system can be improved and the standardization of the relay system can be made easy.

BRIEF DESCRIPTION OF THE DRAWINGS

FIG. 5B shows a flow chart useful in explaining the details of step D in the flow chart in FIG. 5A;

DETAILED DESCRIPTION OF THE PREFERRED EMBODIMENTS

Figure 1:
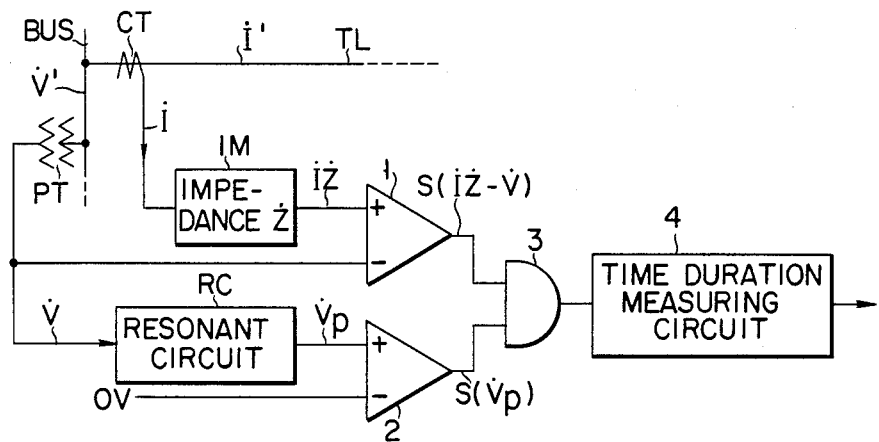
FIG. 1 is a block diagram illustrating principles of a prior art mho relay.
Figure 4:
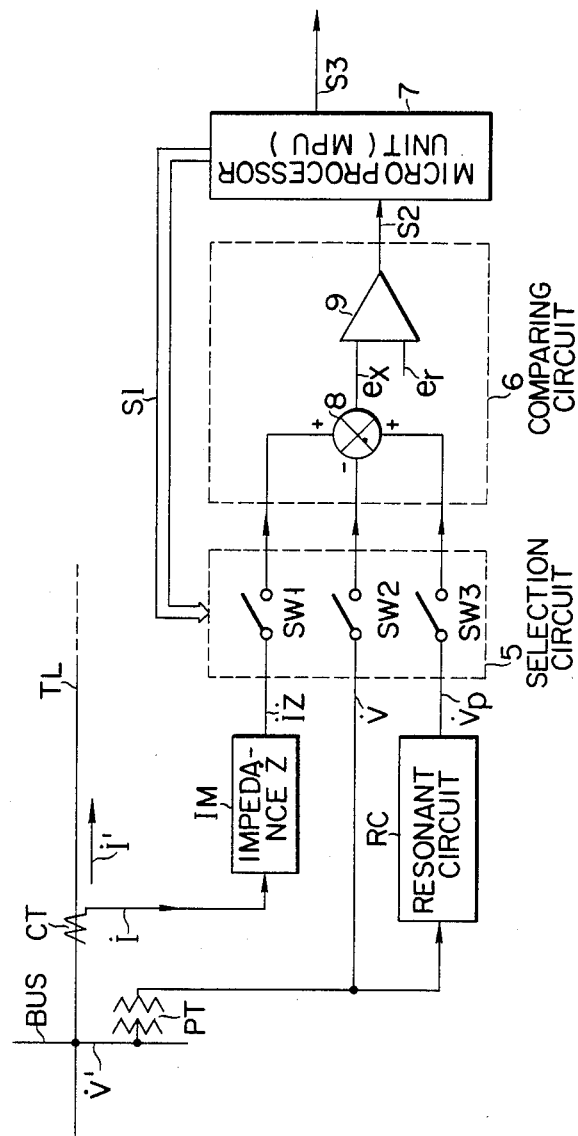
FIG. 4 is a block diagram of a first embodiment according to the present invention.

FIG. 4 shows a block diagram of a first embodiment of the present invention. This embodiment illustrates a mho type distance relay system (a mho relay) for obtaining the characteristic shown in FIG. 2. In FIG. 4, the circuit components transmission line TL, current transformer CT, potential transformer PT, converting circuit IM, and resonant circuit RC and the electrical quantities $\dot{I}'$, $\dot{I}$, $\dot{V}'$, $\dot{V}$, $\dot{IZ}$ and $\dot{V}_p$ will not be given because these have been described referring to FIG. 1. A selection circuit 5 includes switches SW1, SW2 and SW3 coupled at the input terminals with the electrical quantities $\dot{IZ}$, $\dot{V}$ and $\dot{V}_p$, respectively. These switches are switched in a given regular sequence by a selection signal S1 produced by a digital data processing unit such as a microprocessor unit (hereinafter, referred to as MPU) 7. These switches may be electronic switches using electrical field effect transistors or electromagnetic-mechanical switches using electromagnetic coils and armatures. A comparing circuit 6, constituting a comparing means, is made up of a level detector 9 and an adder/subtracter 8 for adding and subtracting the output signals from the switches SW1, SW2 and SW3. In synchronism with the switching operation of the switches SW1, SW2 and SW3, the adder/subtracter 8 sequentially produces sample values representing electrical quantities $\dot{V}_p$ and $(\dot{IZ}-\dot{V})$. The sample value will be designated by $e_x$ for ease of explanation. The level detector 9 compares the sample value $e_x$ with a predetermined reference signal $e_r$. When $e_x \geq e_r$, the level detector 9 produces a logical "1" signal. When $e_x < e_r$, it produces a logical "0" signal. These logical "1" and "0" signals will generally be referred to as a discriminated output signal. In the present embodiment, a MPU 7 is used for the digital data processing unit. The MPU 7 includes components essential to the computer, such as a central processing unit (CPU), a memory device, and an input/output device. The memory device includes a program memory (ROM) for storing a program and a data memory (RAM) for temporarily storing input data, i.e. the discriminated output signal S2. Specifically, MPU 7 produces the selection signal S1 according to a given program stored in the ROM, reads the discriminated output signal S2 from the comparing circuit 6 and performs an arithmetic operation necessary for the mho relay by using the discriminated output signal S2.

Figure 5A:
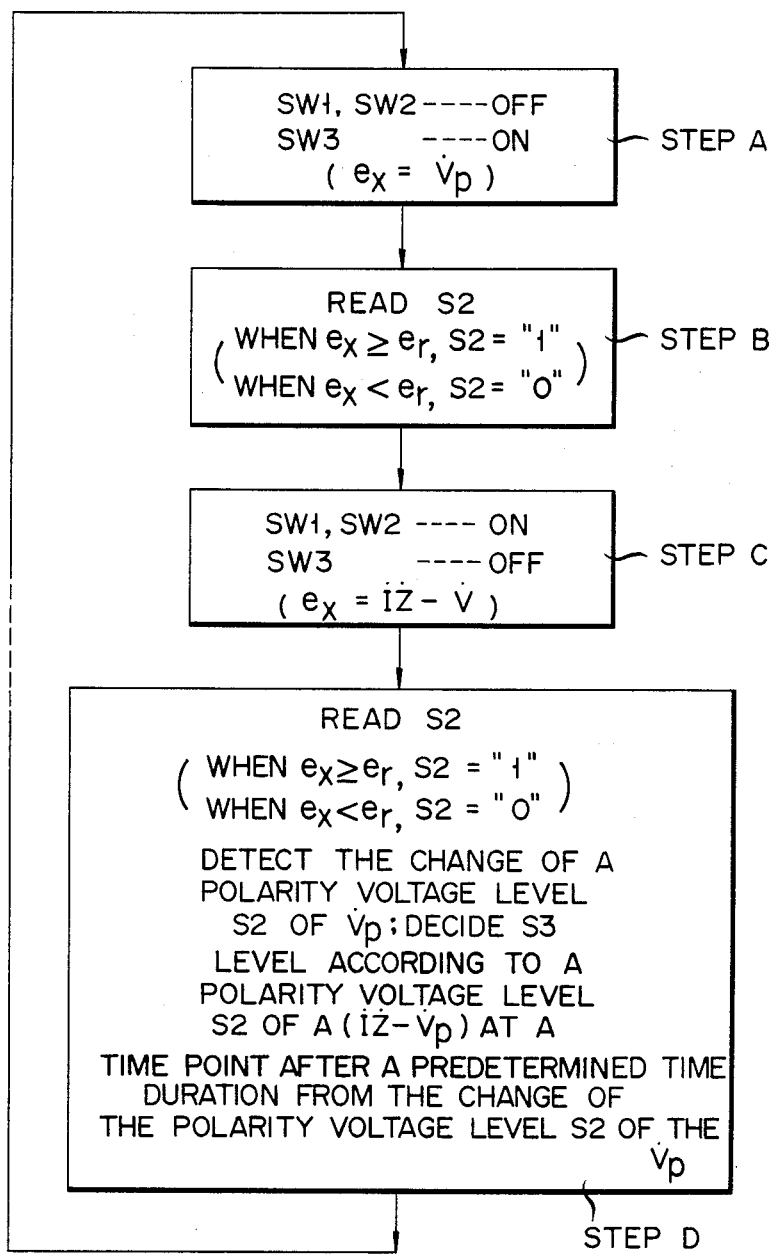
FIG. 5A shows a flow chart useful in explaining the operation of the relay system shown in FIG. 4.
Figure 6:
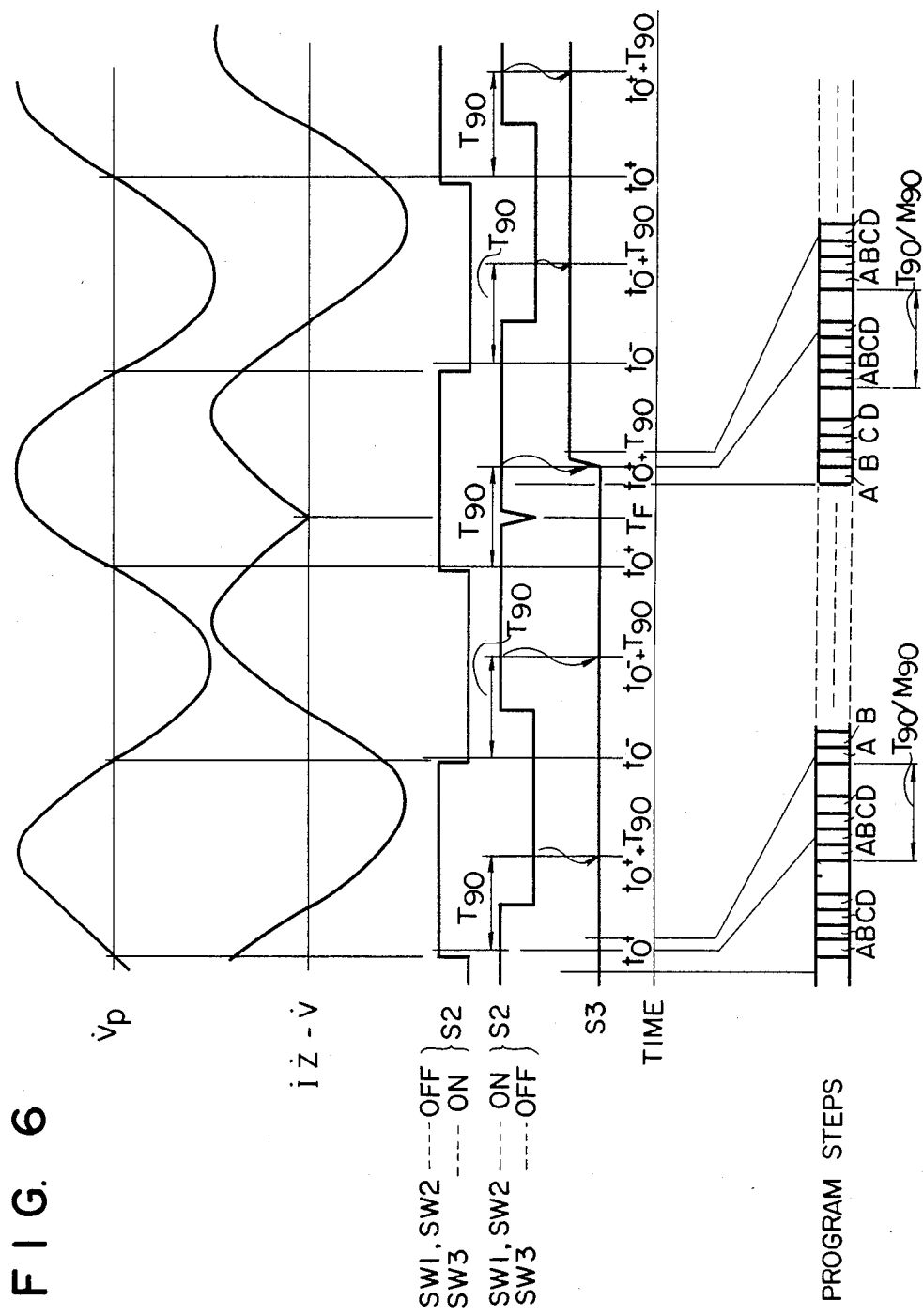
FIG. 6 shows a set of timing charts for explaining sequential operations of the relay system shown in FIG. 4.

The operation of the embodiment shown in FIG. 4 will be described referring to the flow charts shown in FIGS. 5A and 5B and a time chart shown in FIG. 6. In FIG. 5A, in step A, only the switch SW3 is closed, while the switches SW1 and SW2 are opened. As a result, only the polarity voltage $\dot{V}_p$ as an AC electrical quantity is supplied to the adder/subtracter 8, and a sample value $e_x$ of the polarity voltage $\dot{V}_p$ is obtained. The level detector 9 receives the sample value $e_x$ to compare the sample value $e_x$ with the reference signal $e_r$. When $e_x \geq e_r$, it produces a discriminated output signal S2 of "1". Conversely, when $e_x < e_r$, it produces a discriminated output signal S2 of "0". In step B, MPU 7 reads the discriminated output signal S2. In step C, the switches SW1 and SW2 are closed and the SW3 is opened. Under this condition, the electrical quantities $\dot{IZ}$ and $\dot{V}$ are applied to the comparing circuit 6 where the adder/subtracter 8 forms the sample value $e_x$ having a resultant vector $(\dot{IZ}-\dot{V})$. The level detector 9 compares the sample value $e_x$ with the reference signal $e_r$. When $e_x \geq e_r$, it produces the discriminated output signal S2 of "1". When $e_x < e_r$, it produces the discriminated output signal S2 of "0". In step D, MPU 7 reads the discriminated output signal S2 ($t_0^\pm + T90$) relating to the resultant vector $(\dot{IZ}-\dot{V})$ at a time point ($t_0^\pm + T90$), $t_0^\pm$ being reference time points, and T90 corresponding to an electrical angle of 90° counted from the reference time points. The MPU discriminates the polarity of the discriminated output signal $S2(t_0^\pm + T90)$. Here, the reference time point $t_0^-$ to $t_0^+$ designates a time point $t_0$ at which the discriminated output signal S2 relating to $\dot{V}_p$ changes in level, that is, a polarity changing point of the polarity voltage $\dot{V}_p$. The polarity changing point from negative to positive is designated by $t_0^+$ and that from positive to negative is designated by $t_0^-$. According to the result of the polarity discrimination of the discriminated output signal $S2(t_0^\pm + T90)$, MPU 7 produces a protection output signal S3 for the mho relay. The operation will be described in more detail referring to FIG. 6. In FIG. 6, the time point, upon lapse of the time duration corresponding to the electrical angle 90° of the polarity voltage $\dot{V}_p$ from a reference time point $t_0^+$ when the discriminated output signal S2 relating to the polarity voltage $\dot{V}_p$ changes from "0" to "1", is ($t_0^+ + T90$). The discriminated output signal S2 relating to $(\dot{IZ}-\dot{V})$ at the time point ($t_0^+ + T90$) is expressed by $S2(t_0^+ + T90)$. Then, when $S2(t_0^+ + T90) = $ "0", the protection output signal S3 from MPU is "0". When $S2(t_0^+ + T90) = $ "1", the protection output signal S3 = "1". Similarly, the time point, upon lapse of the time duration corresponding to the electrical angle 90° of the polarity voltage $\dot{V}_p$ from a reference time point $t_0^-$ when the signal S2 relating to the polarity voltage $\dot{V}_p$ changes from "1" to "0", is expressed by ($t_0^- + T90$). The discriminated output signal S2 relating to the electrical quantity $(\dot{IZ}-\dot{V})$ at this time point ($t_0^- + T90$) is expressed by $S2(t_0^- + T90)$. When $S2(t_0^- + T90) = $ "0", S3 = "1" and when $S2(t_0^- + T90) = $ "1", S3 = "0".

The reason why the output signal S3 from MPU 7 is the protection output signal is that a phase relation between the polarity voltage $\dot{V}_p$ and the electrical quantity $(\dot{IZ}-\dot{V})$ can be discriminated on the basis of a logical state of "1" or "0" of the discriminated output signal $S2(t_0^\pm + T90)$. See FIG. 2. In more detail, the state in which $S2(t_0^+ + T90) = $ "0" or $S2(t_0^- + T90) = $ "1" indicates that the phase difference between the polarity voltage $\dot{V}_p$ and electrical quantity $(\dot{IZ}-\dot{V})$ is above 90°. While, the state in which $S2(t_0^+ + T90) = $ "1" or $S2(t_0^- + T90) = $ "0" indicates that the phase difference between the polarity voltage $\dot{V}_p$ and electrical quantity $(\dot{IZ}-\dot{V})$ is within 90°.

The detail of step D shown in FIG. 5A will be described referring to the flow chart shown in FIG. 5B. In step d1, the polarity of the polarity voltage $\dot{V}_p$ is discriminated on the basis of the discriminated output signal S2 read by MPU 7 in step B (FIG. 5A). According to the result of the discrimination, the program advances to step d2 or d7. When the polarity voltage $\dot{V}_p$ is positive, in step d2, a positive wave counter PCNT is counted up and the program advances to step d3. In step d3, a negative wave counter NCNT is reset to zero. When the polarity voltage $\dot{V}_p$ is negative, the program advances to step d7. In step d7, the negative wave counter NCNT is counted up, and in step d8 the positive wave counter PCNT is reset to zero. The count of the positive wave counter PCNT in step d2 indicates a time duration from the time point $t_0^+$ (FIG. 6) when the polarity of the polarity voltage $\dot{V}_p$ changes from negative to positive. The count of the negative wave counter NCNT indicates a time duration from the time point $t_0^-$ when the polarity of the polarity voltage $\dot{V}_p$ changes from positive to negative.

In steps d4 and d9, it is discriminated whether or not the counts of the counters PCNT and NCNT are each equal to the numeral $M_{90}$, representing the time duration T90 corresponding to the electrical angle of 90°. When these are not equal to each other, the processing of step D ends and the next step or step A in FIG. 5A is executed. When either the count of the counter PCNT or NCNT is equal to the numeral $M_{90}$, that is, at the time point ($t_0^\pm + T90$) (FIG. 6), the program advances to step B'.

In step B', the discriminated output signal $S2(t_0^\pm + T90)$ from the comparing circuit 6 at the time point ($t_0^\pm + T90$) is read by the MPU 7. The polarity of the read signal, $(\dot{IZ}-\dot{V})$, is discriminated in step d5 or d10. When the condition $(\dot{IZ}-\dot{V}) > 0$ V is satisfied in step d5 or the condition $(\dot{IZ}-\dot{V}) < 0$ V is satisfied in step d10, a protection output signal S3 of "1" is produced in step d6. If one of the above-mentioned conditions is not satisfied, a protection output signal S3 of "0" is produced in step d11.

Figure 2:
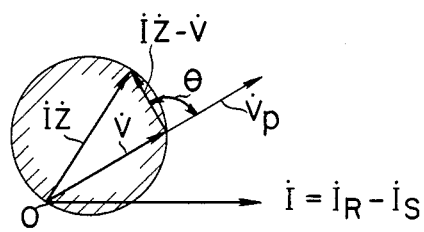
FIG. 2 shows a vector diagram for illustrating a characteristic of a mho relay.

After step D (FIG. 5A) ends, the execution of the program returns to step A and subsequently the above-mentioned sequence of steps is repeated. When the steps are repeated, the state in which S3 (protection output) = "1" is satisfied when a phase difference between the polarity voltage $\dot{V}_p$ and electrical quantity $(\dot{IZ}-\dot{V})$ is within 90°. Thus, a protective relay with the mho characteristic shown in FIG. 2 is obtained.

In the 1st embodiment, the positive and negative wave counters PCNT and NCNT are provided. In the situations where the polarity of the polarity voltage $\dot{V}_p$ changes from positive to negative and vice versa, when a given condition holds in either of the steps d5 and d10 shown in FIG. 5B, the protection output S3 is made "1". Alternately, only when the given condition holds in both the steps d5 and d10, may the protection output signal S3 be rendered "1". In a further modification, in FIG. 5B, only either of the counters PCNT and NCNT may be provided for executing either of steps d5 and d10.

FIG. 6 shows a timing chart to assist in understanding the flow chart shown in FIG. 5B. The timing chart illustrates a situation in which an internal fault takes place in the transmission line TL at a time point $T_F$.

Figure 3:
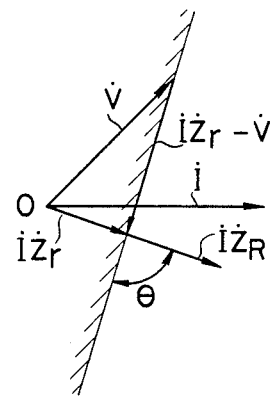
FIG. 3 shows a vector diagram for illustrating a characteristic of an ohm relay.

By modifying the first embodiment shown in FIG. 4, a protective relay system with an ohmic characteristic as shown in FIG. 3 can be realized. In this case, in FIG. 4, an electrical quantity $I\dot{Z}_r$ is used for the electrical quantity $I\dot{Z}$, and the polarity voltage $\dot{V}_p$ and the switch SW3 are omitted. Further, in step A shown in FIG. 5A, the switch SW1 is closed and the switch SW2 is opened and, in step C, the switches SW1 and SW2 are closed. With this modification, a protective relay system with an ohm characteristic in which the protection output signal S3 of "1" is produced when the phase angle between the electrical quantity $I\dot{Z}_r$ and the electrical quantity $(I\dot{Z}_r - \dot{V})$ is within 90°, can be obtained.

Figure 7:
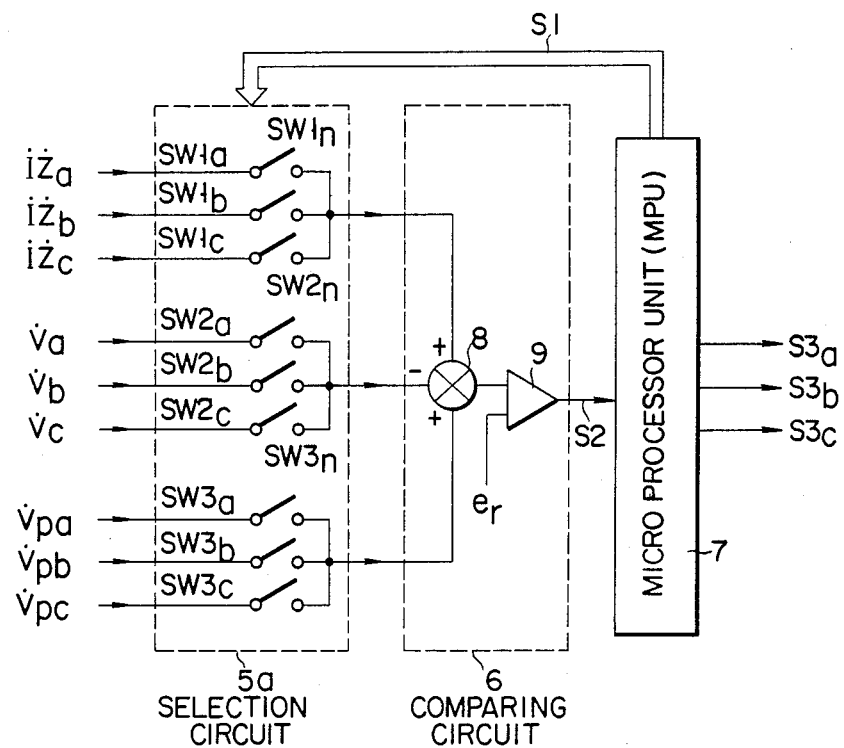
FIG. 7 is a block diagram illustrating a second embodiment according to the present invention.
Figure 8:
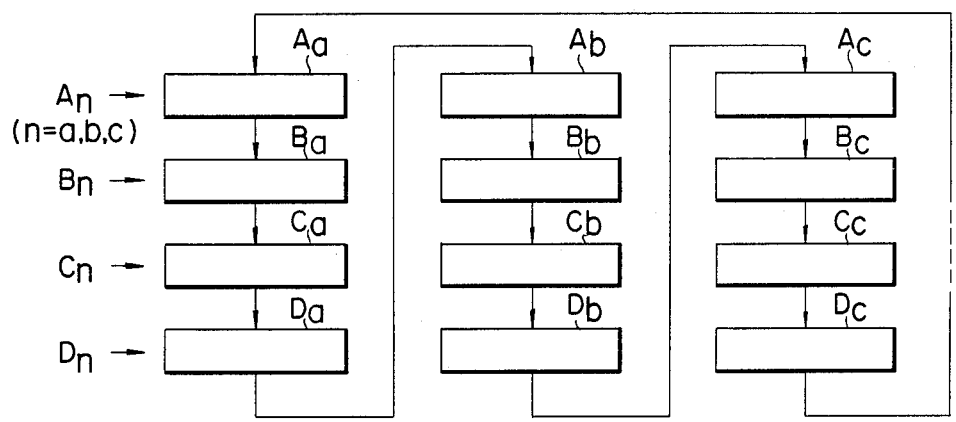
FIG. 8 shows a flow chart for illustrating the operation of the embodiment shown in FIG. 7.

FIG. 7 shows a block diagram of an arrangement of a 2nd embodiment of the present invention. FIG. 8 shows a flow chart corresponding to FIG. 7. In the 2nd embodiment, the first embodiment shown in FIG. 4 is applied for the protective relay system for three phase power transmission lines. In the 2nd embodiment, suffixes a, b and c attached to the symbols representing the input electrical quantities to the selection circuit 5a, the switches, and the protection output signals from MPU 7, correspond to the a, b and c phases of the power transmission lines to be protected, respectively. No further explanation of them will be given. In FIG. 7, electrical quantities $I\dot{Z}_n$, $\dot{V}_n$ and $\dot{V}_{pn}$ (hereinafter, the suffix n attached to a symbol represents a, b or c) supplied to the selection circuit 5a are led through the switches SW1$_n$, SW2$_n$ and SW3$_n$ to the comparing circuit 6. The switching operation of these switches are controlled by a selection signal S1 from MPU 7, like the FIG. 4 embodiment. The comparing circuit 6 likewise contains the adder/subtracter 8 and the level detector 9.

The flow chart of FIG. 8 for explaining the operation of the FIG. 7 circuit corresponds to the flow chart of FIG. 5A when it is applied for the three phase system. Steps $A_n$ to $D_n$ correspond to steps A, B, C and D in FIG. 5A. In FIG. 8, in step $A_n$, only the switch SW3$_n$ is closed, and the remaining switches are opened. In step $B_n$, the discriminated output signal S2 from the comparing circuit 6, representing the result of the comparison as to whether or not the polarity voltage $\dot{V}_{pn}$ is above a given level, is applied to MPU 7. In step $C_n$, only the switches SW1$_n$ and SW2$_n$ are closed, while the remaining switches are opened. In this step $C_n$, the discriminated output signal S2 obtained from the comparing circuit 6 depends on the polarity of the electrical quantity $(I\dot{Z}_n - \dot{V}_n)$. That is, when $(I\dot{V}_n - \dot{V}_n) > 0$, S2 of "1" is obtained and when $(I\dot{Z}_n - \dot{V}_n) < 0$, S2 of "0" is obtained.

In step $D_n$, MPU 7 reads the discriminated output signal S2 at the time point $(t_{0n}{}^{\pm} + T90)$ and produces a protection output signal S3$_n$, as follows:

When $S2(t_{0n}{}^+ + T90) = $"0", S3n = "0", and when $S2(t_{0n}{}^+ + T90) = $"1", S3$_n$ = "1", or when $S2(t_{0n}{}^- + T90) = $"0", S3$_n$ = "1", and when $S2(t_{0n}{}^- + T90) = $"1", S3$_n$ = "0".

The above description indicates that when a phase difference between the polarity voltage $\dot{V}_{pn}$ and electrical quantity $(I\dot{Z}_n - \dot{V}_n)$ is within 90°, the protection output signal S3$_n$ of n-phase is produced. As described above, a protective relay system with the three-phase mho characteristic can be obtained with a mere modification that the input electrical quantities in FIG. 4 are set to electrical quantities $I\dot{Z}_n$, $\dot{V}_n$ and $\dot{V}_{pn}$, and the switches SW1$_n$ through SW3$_n$ are provided.

Figure 9:
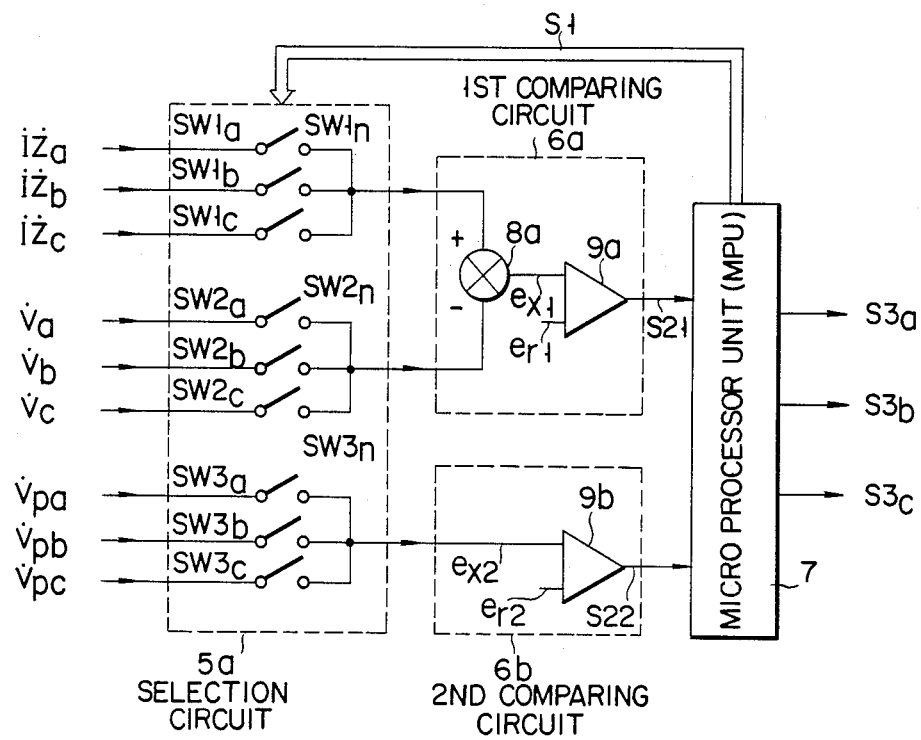
FIG. 9 shows a block diagram of a third embodiment according to the present invention.

While in the 2nd embodiment shown in FIG. 7, a single comparing circuit 6 is used for both the polarity detection of the polarity voltage $\dot{V}_{pn}$ and the polarity discrimination of the electrical quantity $(I\dot{Z} - \dot{V}_n)$, the 3rd embodiment of FIG. 9 includes first and second comparing circuits 6a and 6b. The first comparing circuit 6a is made up of an adder/subtracter 8a and a level detector 9a. The second comparing circuit 6b includes a level detector 9b. The circuit arrangement of the selection circuit 5a and the input electrical quantities applied to the same are exactly the same as those in the 2nd embodiment shown in FIG. 7. The adder/subtracter 8a receives the electrical quantities $I\dot{Z}_n$ and $\dot{V}_n$ through the switches SW1$_n$ and SW2$_n$ in the selection circuit 5a and applies the sample value $e_{x1}$ to the level detector 9a. The level detector 9a compares the sample value $e_{x1}$ with the first reference signal $e_{r1}$ to apply the discriminated output signal S21 according to the polarity of the electrical quantity $(I\dot{Z}_n - \dot{V}_n)$ to MPU 7. In this case, when $(I\dot{Z}_n - \dot{V}_n) > 0$, S21 = "1", and when $(I\dot{Z}_n - \dot{V}_n) < 0$, S21 = "0". The level detector 9b in the second comparing circuit 6b receives at one input terminal the polarity voltage $\dot{V}_{pn}$ through the switch SW3$_n$ in the selection circuit 5a, and receives at the other input terminal the second reference signal $e_{r2}$. Then, the detector 9b applies the discriminated output signal S22 according to the polarity of the polarity voltage $\dot{V}_{pn}$ to MPU 7. This discriminated output signal S22 is used for detecting the polarity of the polarity voltage $\dot{V}_{pn}$ in MPU 7. The program processing of MPU 7 in FIG. 9 is substantially the same as that of FIG. 8, except for the following processing. For applying the polarity detecting result of the polarity voltage $\dot{V}_{pn}$ of the comparing circuit 6b in step B$_n$, the discriminated output signal S22 of the comparing circuit 6b is applied to MPU 7. For discriminating the polarity of the electrical quantity $(I\dot{Z}_n - \dot{V}_n)$ at a time point $(t_0{}^{\pm} + T90)$ in step D$_n$, the discriminated output signal S21 in the comparing circuit 6a is applied to MPU 7. The first comparing circuit 6a in FIG. 9 may be substituted by the first comparing circuit in FIG. 1.

Figure 10:
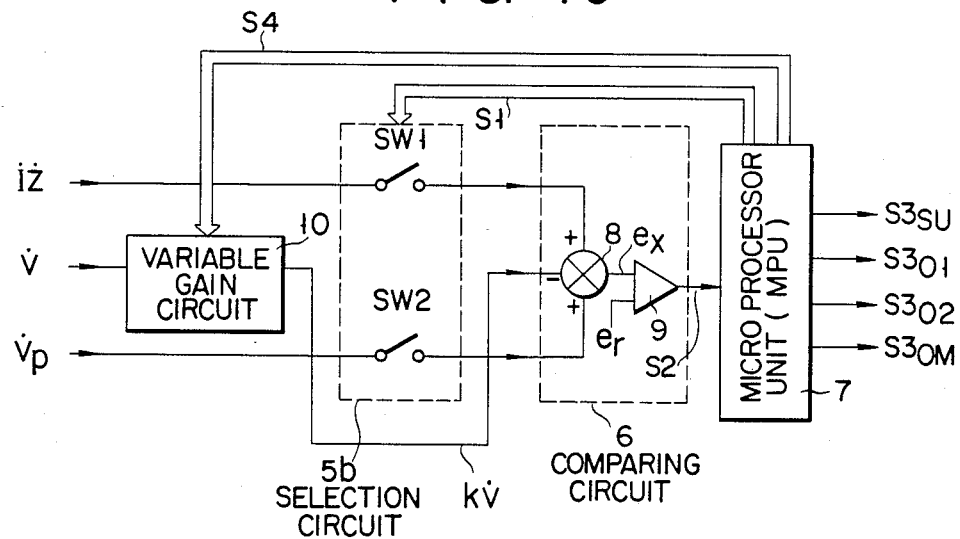
FIG. 10 shows a block diagram of a fourth embodiment according to the present invention.

A 4th embodiment shown in FIG. 10 is a distance relay system with (a) a mho characteristic, (b) an offset mho characteristic, (c) a first-stage reactance characteristic, and (d) a second-stage reactance characteristic. The input electrical quantities in the circuit of FIG. 10 are $I\dot{Z}$, $\dot{V}$ and $\dot{V}_p$, respectively. The electrical quantity $I\dot{Z}$ is the product of an impedance $\dot{Z}$ with an impedance angle 75° and the electrical quantity $\dot{I}$ and the polarity voltage $\dot{V}_p$ are led to the switches SW1 and SW2, respectively. The output electrical quantities from the switches SW1 and SW2 are applied to the comparing circuit 6. The switching of the switches SW1 and SW2 is under control of the selection signal S1 from MPU 7. The input electrical quantity $\dot{V}$ is applied to the comparing circuit 6 through a variable gain circuit 10 of which the gain K is changed to a value k by a control signal S4. The comparing circuit 6 includes an adder/subtracter 8 and a level detector 9, like the comparing circuit in FIG. 4. The adder/subtracter 8 makes an addition or subtraction of the input electrical quantities IZ, kV (output electrical quantity from the variable gain circuit), and the polarity voltage $\dot{V}_p$, and applies the sample value $e_x$ to the level detector 9. The level detector 9 compares the sample value $e_x$ with the reference signal $e_r$ and applies the result of the discriminated output signal S2 to MPU 7, as in the case of the FIG. 4 embodiment. MPU 7 produces a protection output signal $S3_{SU}$ corresponding to the mho characteristic, a protection output signal $S3_{01}$ corresponding to the first-stage reactance characteristic, a protection output signal $S3_{02}$ corresponding to the second-stage reactance characteristic, and a protection output signal $S3_{0M}$ corresponding to the offset mho characteristic.

Before describing the operation of the FIG. 10 embodiment, the relay characteristics obtained by the circuit of FIG. 10 will first be described referring to FIGS. 11A to 11D. The relay characteristics are determined only by the phase relation of two vectors.

Figure 11A:
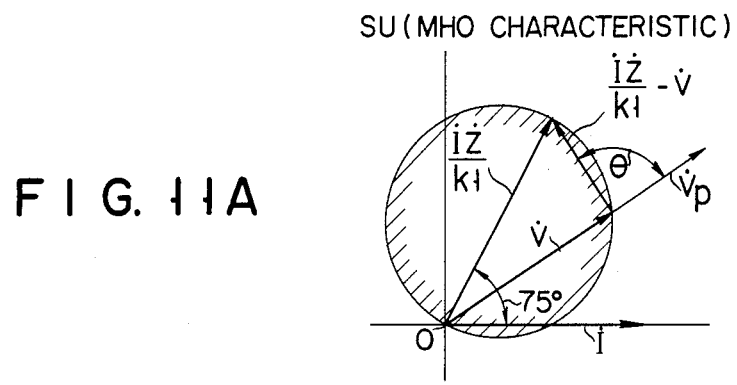
FIGS. 11A to 11D show a mho relay characteristic, an offset mho relay characteristic, a first stage characteristic of a reactance relay, and a second stage characteristic of the reactance relay, respectively.

FIG. 11A: Mho characteristic (SU)

Provides a protection output signal $S3_{SU}$ when the phase difference $\theta$ between the polarity voltage $\dot{V}_p$ and the electrical quantity $[(\dot{I} \times Z/k1) - \dot{V}]$ is within 90°.

Figure 11B:
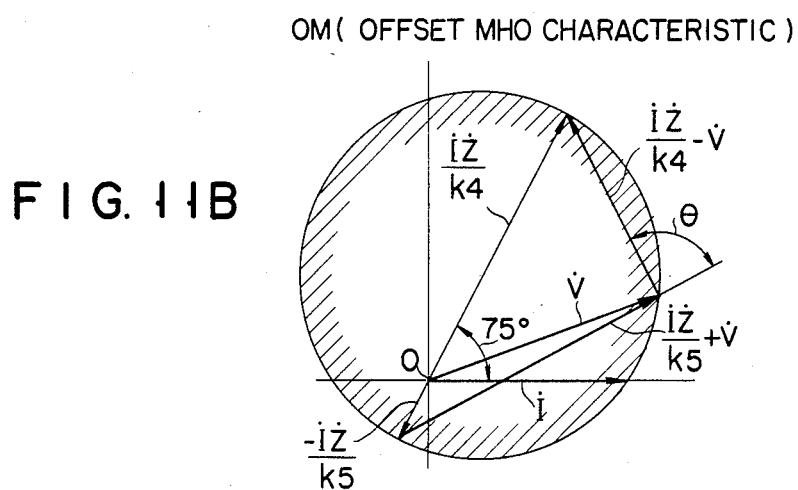

FIG. 11B: Offset mho characteristic (OM)

Provides a protection output signal $S3_{0M}$ when the phase difference $\theta$ between the electrical quantities $[(\dot{I} \times Z/k5) + \dot{V}]$ and $[(\dot{I} \times Z/k4) - \dot{V}]$ is within 90°.

Figure 11C:
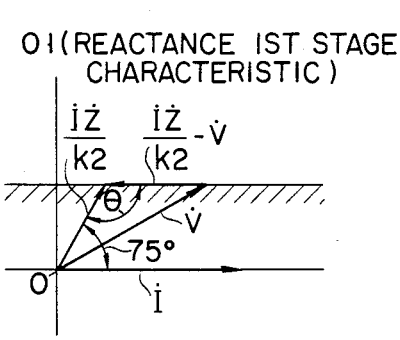

FIG. 11C: Reactance 1st stage characteristic (01)

Provides a protection output signal $S3_{01}$ when the phase difference $\theta$ between the electrical quantities $(\dot{I} \times \dot{Z}/k2)$ and $[(\dot{I} \times Z/k2) - \dot{V}]$ falls within a range from $-75°$ to 0° to 105°.

Figure 11D:
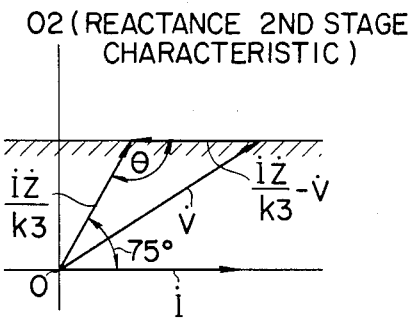

FIG. 11D: Reactance second stage characteristic (02)

Provides a protection output signal $S3_{02}$ when the phase difference between the electrical quantities $(\dot{I} \times \dot{Z}/k3)$ and $[(\dot{I} \times Z/k3) - \dot{V}]$ falls within $-75°$ to 0° to 105°.

The k1 to k5 are gains of the variable gain circuit 10. If the vectors are multiplied by constants k1 to k5, the phases between these vectors are left unchanged. Therefore, in the FIG. 10 embodiment, the phase relation of vectors is discriminated using the following vectors:

Characteristic SU: $\dot{V}_p$ and $(\dot{I}\dot{Z}-k1\dot{V})$
Characteristic OM: $(\dot{I}\dot{Z}+k5\dot{V})$ and $(\dot{I}\dot{Z}-k4\dot{V})$
Characteristic 01: $\dot{I}\dot{Z}$ and $(\dot{I}\dot{Z}-k2\dot{V})$
Characteristic 02: $\dot{I}\dot{Z}$ and $(\dot{I}\dot{Z}-k3\dot{V})$ The operation of the FIG. 10 embodiment will be described referring to the flow chart shown in FIG. 12. In step $A_{SU}$, the switch SW1 in the selection circuit 5b is opened and the switch SW2 is closed. In step $E_{SU}$, the gain K of the variable gain circuit 10 is made zero. Through steps $A_{SU}$ and $E_{SU}$, only the polarity voltage $\dot{V}_p$ is applied to the comparing circuit 6. In step $B_{SU}$, MPU 7 reads a discriminated output signal S2 derived from the comparing circuit 6 and representing the result of check as to whether the polarity voltage $\dot{V}_p$ is above or below a given level 0 V. In step $C_{SU}$, the switch SW1 in the selection circuit 5b is closed and the switch SW2 is opened. In step $F_{SU}$, the gain K of the variable gain circuit 10 is made k1. Through steps $C_{SU}$ and $F_{SU}$, the electrical quantities $\dot{I}\dot{Z}$ and $k1\dot{V}$ are applied to the comparing circuit 6 which in turn produces a discriminated output signal S2 according to the polarity of the electrical quantity $(\dot{I}\dot{Z}-k1\dot{V})$.

In step $D_{SU}$, the level of the protection output signal $S3_{SU}$ is determined according to the level of the discriminated output signal S2 $(t_{0SU}{}^{\pm}+T90)$ of the comparing circuit 6 at the time point $(t_{0SU}{}^{\pm}+T90)$, as described in FIG. 6. That is, when $S2(t_{0SU}{}^{+}+T90)=$"1", $S3_{SU}=$"1" and when $S2(t_{0SU}{}^{+}+T90)=$"0", $S3_{SU}=$"0" or, when $S2(t_{0SU}{}^{-}+T90)=$"1", $S3_{SU}=$"0", and when $S2(t_{0SU}{}^{-}+T90)=$"0", $S3_{SU}=$"1".

Through the above steps, the protection output signal $S3_{SU}$ with the mho characteristic (FIG. 11A) is obtained.

The steps to follow will be performed in a similar way to the above-mentioned steps. In step $A_0$, the switch SW1 in the selection circuit 5b is closed and the SW2 is opened. In step $E_0$, the gain of the variable gain circuit 10 is made zero. As a result, the input electrical quantity to the comparing circuit 6 is only the electrical quantity $\dot{I}\dot{Z}$. In step $B_0$, MPU 7 reads a discriminated output signal S2 derived from the comparing circuit 6 indicating whether the level of the electrical quantity $\dot{I}\dot{Z}$ is above or below a given level 0 V. In step $F_{01}$, the gain K of the variable gain circuit 10 is made k2, so that the comparing circuit 6 has input electrical quantities of $\dot{I}\dot{Z}$ and $k2\dot{V}$. The comparing circuit 6 applies the discriminated output signal S2 according to the polarity of the electrical quantity $(\dot{I}\dot{Z}-k2\dot{V})$ to MPU 7. In step $D_{01}$, as described referring to FIG. 6, the level of the protection output signal $S3_{01}$ is determined according to the level of the discriminated output signal $S2(t_0{}^{\pm}+T75)$ of the comparing circuit 6 at a time point $(t_0{}^{\pm}+T75)$ after the time period corresponding to an electrical angle 75° from the time point $(t_{00}{}^{\pm})$ at which the polarity of the electrical quantity $\dot{I}\dot{Z}$ changes.

Namely, when $S2(t_{00}{}^{+}+T75)=$"1", $S3_{01}=$"1", and when $S2(t_{00}{}^{+}+T75)=$"0", $S3_{01}=$"0", or $S2(t_{00}{}^{-}+T75)=$"1", $S3_{01}=$"0", and when $S2(t_{00}{}^{-}+T75)=$"0", $S3_{01}=$"1".

The reactance second stage characteristic (02) is also processed as in steps $F_{01}$ and $D_{01}$. In particular, in step $F_{02}$, the gain K of the variable gain circuit 10 is made k3, so that the comparing circuit 6 applies the discriminated output signal S2 according to the polarity of the electrical quantity $(\dot{I}\dot{Z}-k3\dot{V})$ to MPU 7. In step $D_{02}$, the following results are obtained.

When $S2(t_{00}{}^{+}+T75)=$"1", $S3_{02}=$"1", and when $S2(t_{00}{}^{+}+T75)=$"0", $S3_{02}=$"0", or when $S2(t_{00}{}^{-}+T75)=$"1", $S3_{02}=$"0", and when $S2(t_{00}{}^{-}+T75)=$"0", $S3_{02}=$"1".

In a step $E_{OM}$, the gain K of the variable gain circuit 10 is set to $-k5$. In step $B_{OM}$, the comparing circuit 6 checks whether the electrical quantity $(\dot{I}\dot{Z}+k5\dot{V})$ is above or below a given level 0 V, and the discriminated output signal S2 according to the polarity of the electrical quantity $(\dot{I}\dot{Z}+k5\dot{V})$ is applied to MPU 7. In step $F_{OM}$, the gain K of the variable gain circuit 10 is changed to k4. As a result of the change of the gain, a discriminated output signal S2 corresponding to the polarity of the electrical quantity $(\dot{I}\dot{Z}-k4\dot{V})$ is obtained from the comparing circuit 6. In step $D_{OM}$, as seen from FIG. 5B, the level of the protection output signal $S3_{0M}$ of the relay with the offset mho characteristic OM (FIG. 11B) is determined. That is, when $S2(t_{00M}{}^{+}+T90)=$"1", $S3_{0M}=$"1", when $S2(t_{00M}{}^{+}+T90)=$"0", $S3_{0M}=$"0", or when $S2(t_{00M}{}^{-}+T90)=$"1", $S3_{0M}=$"0", and when $S2(t_{00M}{}^{-}+T90)=$"0", $S3_{0M}=$"1".

Figure 12:
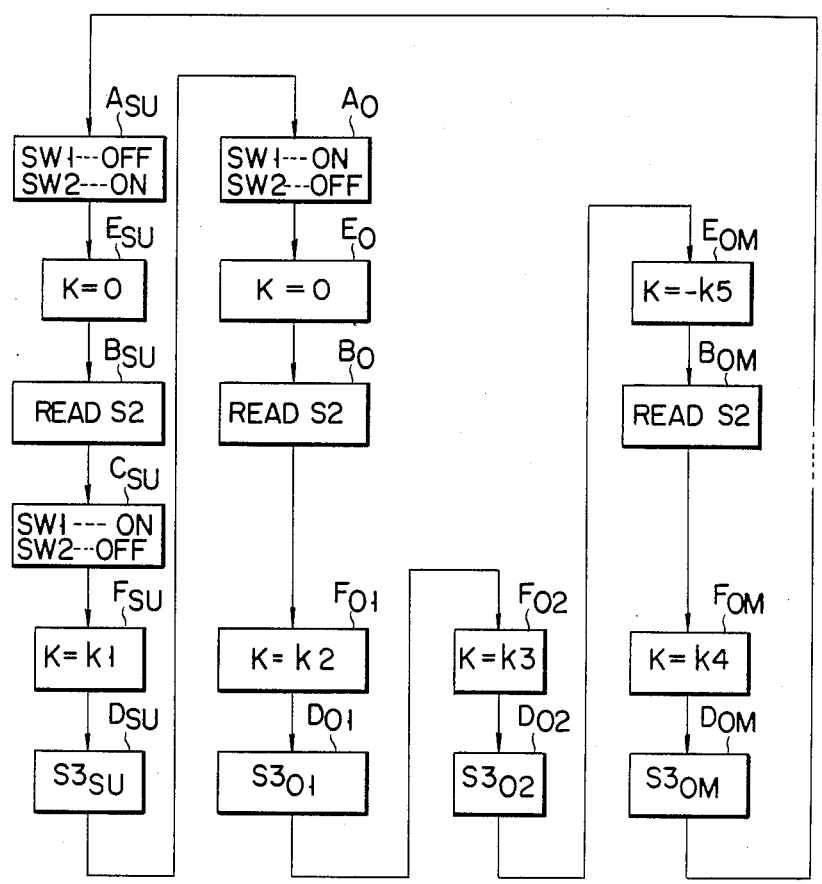
FIG. 12 shows a flow chart for explaining the operation of the embodiment shown in FIG. 10.

In the explanation of FIG. 10, the gain of the variable gain circuit 10 is made zero in steps $E_{SU}$ and $E_O$ in FIG. 12. In connection with this, the variable gain circuit may have a switching function in such a manner that the switches SW1 and SW2 in FIG. 10 are substituted by the variable gain circuit 10 and the gain K is controlled to 1 or 0.

Figure 13:
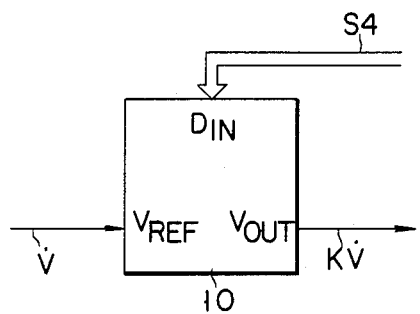
FIG. 13 shows a block diagram of an example of a variable gain circuit shown in FIG. 14.

The variable gain control circuit 10 shown in FIG. 10 may be formed using a well known digital to analog converter. FIG. 13 shows an arrangement of the digital to analog converter. As shown, an input electrical quantity is applied to a reference voltage input terminal $V_{REF}$ (in the case of FIG. 10, the electrical quantity $\dot{V}$ is applied). The gain K is applied to the digital signal input terminal $D_{IN}$ in the form of a digital code. And if the digital code is changed by the control signal S4 from MPU 7, the desired gain may be obtained.

Figure 14:
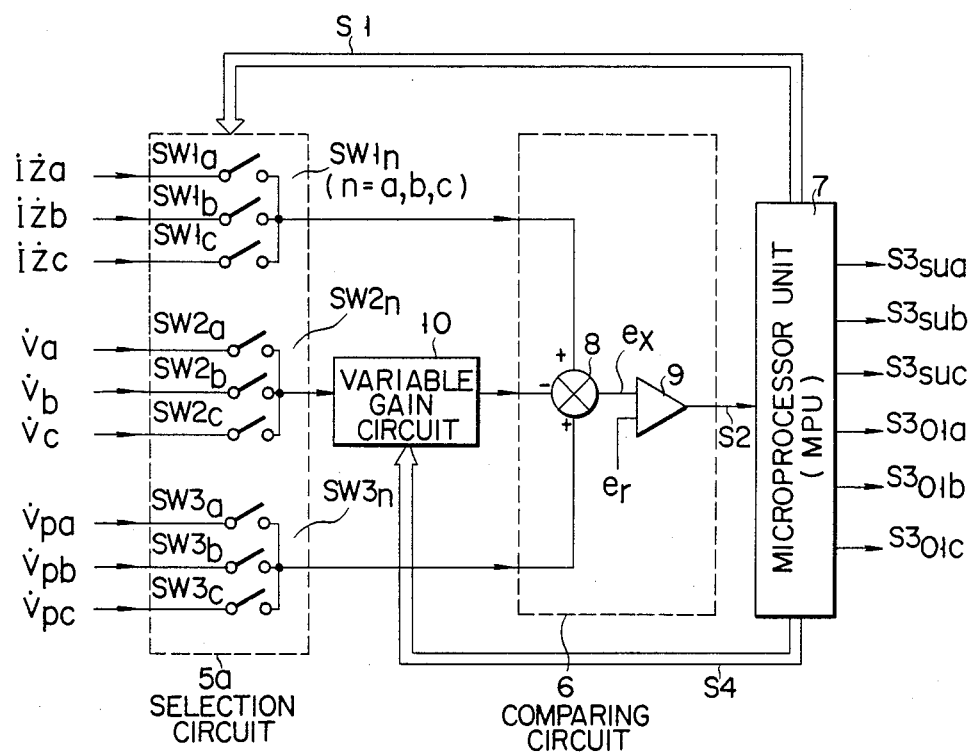
FIG. 14 shows a block diagram of a fifth embodiment according to the present invention.

FIG. 14 shows a block diagram of a fifth embodiment of the present invention. In the embodiment shown in FIG. 14, the distance relay system with the single phase multi-function shown in FIG. 10 is applied for a distance relay system with three phase multi-function protection. For ease of explanation, the relay system has the mho characteristic (SU) shown in FIG. 11A and the reactance first-stage characteristic (01) in FIG. 11C. The circuit arrangements of the selection circuit 5a and the comparing circuit 6 are the same as those in FIG. 7. Accordingly, no further explanation will be given.

However, one difference between the FIG. 14 embodiment and the FIG. 7 embodiment resides in that the electrical quantity $\dot{V}_n$ is transferred through the switch $SW2_n$ in the selection circuit 5a and then is applied to the comparing circuit 6 via the variable gain circuit 10. The gain of the variable gain circuit 10 is controlled by the control signal S4 from MPU 7, like the FIG. 10 embodiment.

Figure 15:
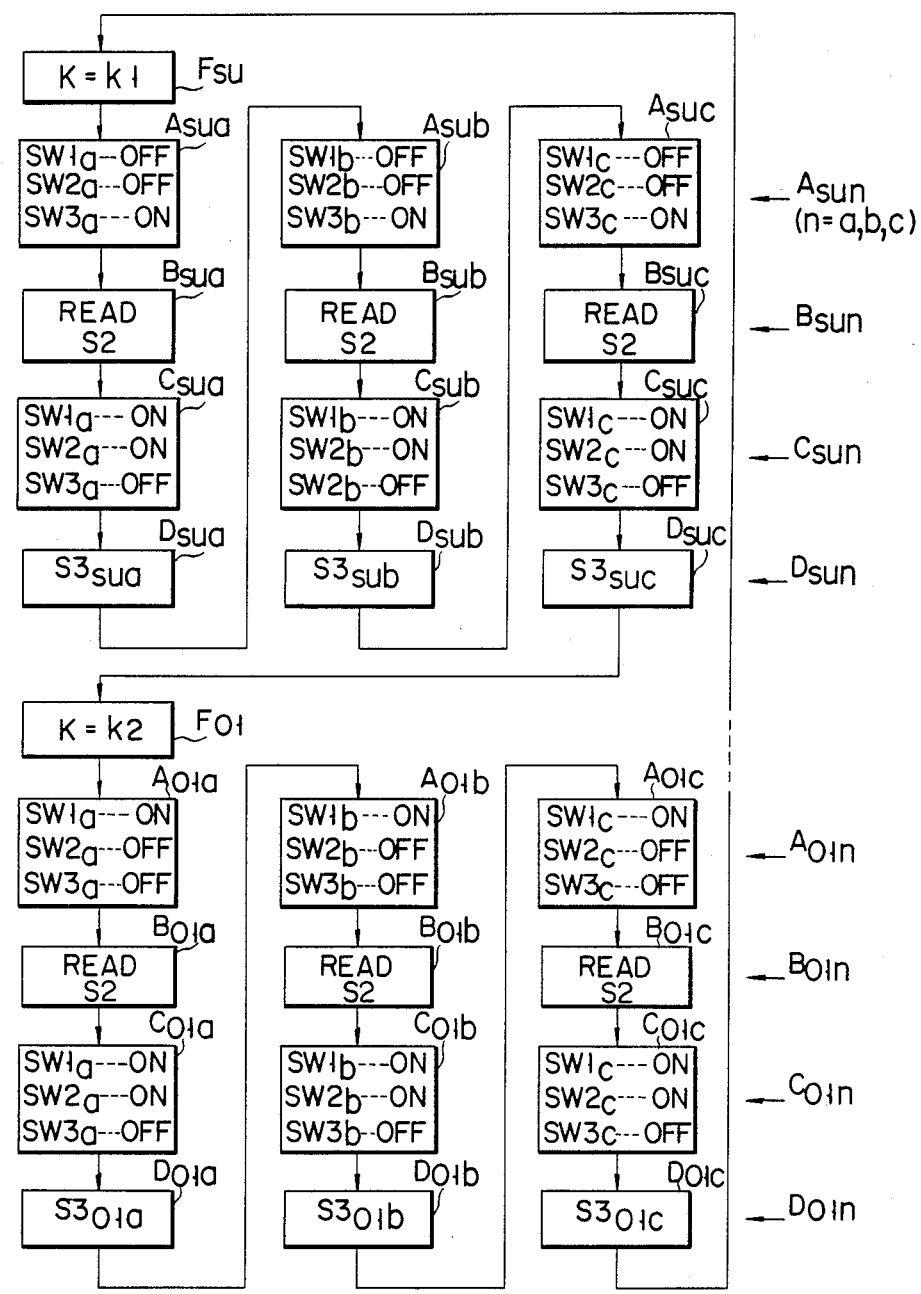
FIG. 15 shows a flow chart for explaining the operation of the embodiment shown in FIG. 14.

FIG. 15 shows an example of a flow chart of a program executed in MPU 7 in FIG. 14, which is substantially the same as those of FIGS. 8 and 12. Only the contents of the processing for each step will be described hereinafter. In the description of the present invention, the suffix n indicates a, b and c as described before.

In step $F_{SU}$, the gain of the variable gain circuit 10 is set to a setting value k1 for setting the mho characteristic (SU) (FIG. 11A). In step $A_{SUn}$, only the switch $SW3_n$ is closed, while the remaining switches $SW1_n$ and $SW2_n$ are opened. In step $B_{SUn}$, MPU 7 reads the resulted discriminated output signal S2 (the comparison result from the comparing circuit 6) as to whether the polarity voltage $\dot{V}_{pn}$ is above or below a given level 0 V. In step $C_{SUn}$, the switches $SW1_n$ and $SW2_n$ are closed, while the switch $SW3_n$ is opened. In ste $D_{SUn}$, MPU 7 reads the discriminated output signal $S2(t_{0SUn}\pm +T90)$ from the comparing circuit 6 to discriminate the polarity of the electrical quantity $(\dot{IZ}_n - k1\dot{V}_n)$ at a time point $(t_{0SUn}\pm +T90)$, as described referring to FIG. 6. On the basis of the discrimination, a protection output signal $S3_{SUn}$ is determined in the following way.

When $S2(t_{0SUn}+ +T90)=$"1", $S3_{SUn}=$"1", and when $S2(t_{0SUn}+ +T90)=$"0", $S3_{SUn}=$"0", or when $S2(t_{0SUn}- +T90)=$"1", $S3_{SUn}=$"0", and when $S2(t_{0SUn}- +T90)=$"0", $S3_{SUn}=$"1".

In step $F_{01}$, the gain K of the variable gain circuit 10 is set to a setting value k2 for setting the reactance first stage characteristic (01) (FIG. 11C). In step $A_{01n}$, only the switch $SW1_n$ is closed, while the switches $SW2_n$ and $SW3_n$ are opened. In step $B_{01n}$, MPU 7 reads the discriminated output signal S2 representing whether the electrical quantity $\dot{IZ}_n$ is above or below a given level 0 V. In step $C_{01n}$, the switches $SW1_n$ and $SW2_n$ are closed, while the switch $SW3_n$ is opened. In step $D_{01n}$, the polarity of the electrical quantity $(IZ_n - k2\dot{V}_n)$ at a time point $(t_{001n}\pm +T75)$ is discriminated by applying the discriminated output signal $S2(t_{001n}\pm +T75)$ from the comparing circuit 6 to MPU 7. On the basis of the result of the discrimination, a level of a protective output signal $S3_{01n}$ is determined in the following way.

When $S2(t_{001n}+ +T75)=$"1", $S3_{01n}=$"1", and when $S2(t_{001n}+ +T75)=$"0", $S3_{01n}=$"0", or when $S2(t_{001n}- +T75)=$"1", $S3_{01n}=$"0", and when $S2(t_{001n}- +T75)=$"0", $S3_{01n}=$"1".

Figure 16:
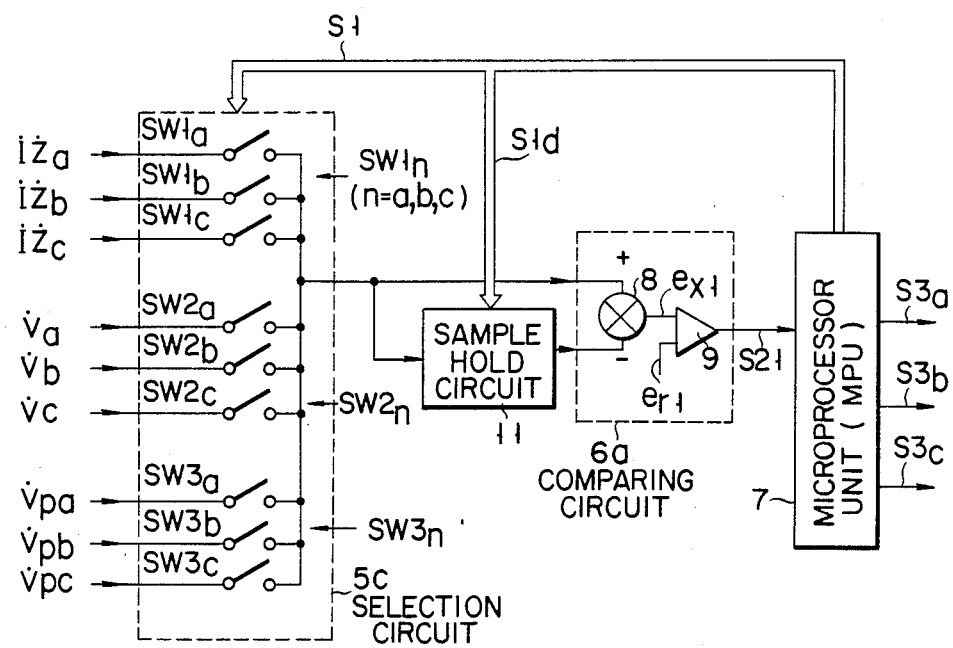
FIG. 16 is a block diagram of a sixth embodiment according to the present invention.

FIG. 16 shows a block diagram of a sixth embodiment of the present invention. The FIG. 16 embodiment has the same function as the FIG. 7 or 9 embodiment. In the present embodiment, the selection circuit 5C is comprised of a switch circuit with a common output terminal, which is called a multiplexer. With this arrangement, a holding circuit 11 containing a sample/hold circuit is provided as a pre-stage of the comparing circuit 6a. A control signal $S1_d$ for resetting the hold circuit 11 is produced from MPU 7. The operation of the FIG. 16 embodiment will be described using the flow chart shown in FIG. 8. In step $A_n$, the switch $SW3_n$ is closed and the switches $SW1_n$ and $SW2_n$ are open. In step $B_n$, the discriminated output signal S21 derived from the comparing circuit 6a and representing the result of checking as to whether the polarity voltage $V_{pn}$ is above or below a given value 0 V is applied to MPU 7. At this time, the holding circuit 11 is reset by the control signal $S1_d$ to produce no output signal. In step $C_n$, only the switch $SW2_n$ is closed and a value of the polarity voltage $\dot{V}_n$ at that time is held in the holding circuit 11. Then, only the switch $SW1_n$ is closed. Since the switch $SW1_n$ is closed, the electrical quantity $\dot{IZ}_n$ and the output electrical quantity $\dot{V}_n$ from the holding circuit 11 are applied to the input terminals of the comparing circuit 6a. The application of these signals are not exactly simultaneous, but may be considered to be practically simultaneous. In step $D_n$, the polarity of the electrical quantity $(\dot{IZ}_n - \dot{V}_n)$ is discriminated according to the level of the discriminated output signal of the comparing circuit 6a. Thus, the level of the protection output signal $S3_n$ is determined.

Figure 17:
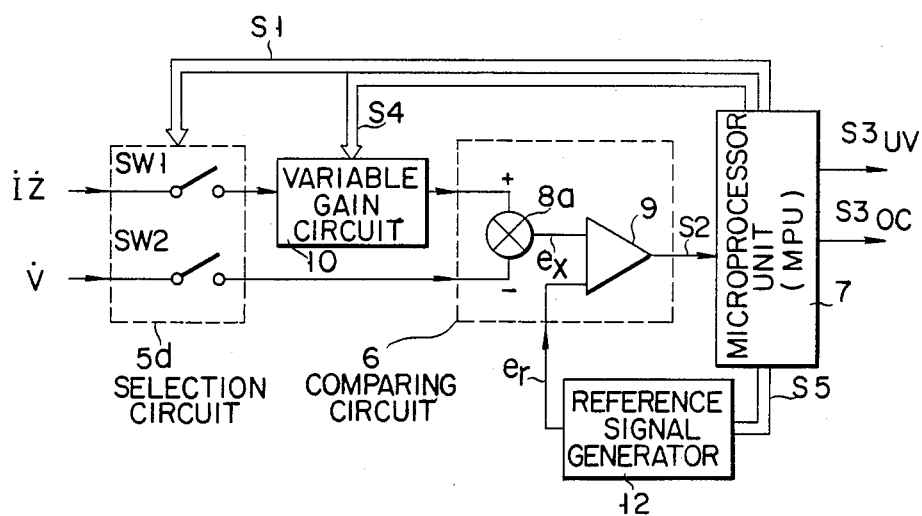
FIG. 17 shows a block diagram of a seventh embodiment according to the present invention.

FIG. 17 shows in block form a 7th embodiment of the present invention. In FIG. 17, input electrical quantities $\dot{IZ}$ and $\dot{V}$ are led to a selection circuit 5d containing switches SW1 and SW2. The electrical quantity IZ is led into a variable gain circuit 10 via the switch SW1. The output signal from the variable gain circuit 10 is applied to the comparing circuit 6. The electrical quantity $\dot{V}$ is applied to the comparing circuit 6 via the switch SW2. A reference signal $e_r$ from a reference signal generating circuit 12 is also applied to the comparing circuit 6. A subtracter circuit 8a in the comparing circuit 6 subtracts the electrical quantity V from the output signal of the variable gain circuit 10, and applies its output signal or sample value $e_x$ to a level detector 9. The level detector 9 applies to MPU 7 a discriminated output signal S2 with a logical level according to the result of the comparison of the sample value $e_x$ with the reference signal $e_r$. MPU 7 applies a control signal S1 for controlling the switchings of the switches SW1 and SW2, and a control signal S4 to the variable gain circuit 10 for controlling its gain, and another control signal S5 to the reference signal generating circuit 12 for changing its output reference signal $e_r$. Then, MPU 7 determines the logical levels of protection output signals $S3_{UV}$ and $S3_{01}$, and produces them. The FIG. 17 embodiment represents a protective relay system having a characteristic of a current compensating under voltage protective relay (of which the protection output signal is designated by $S3_{UV}$) and a characteristic of an over current relay (of which the protection output signal is designated by $S3_{OC}$). The current compensating under voltage relay will be described referring to FIG. 18. In a vector diagram shown in FIG. 18, the rectangular hatched area indicates a protection area of the current compensating under voltage protective relay. The rectangular area is surrounded by two lines parallel to an electrical quantity $\ddot{IZ}_{kz}$ and two lines perpendicular to the electrical quantity $\dot{IZ}_{kz}$. When the electrical quantity V is within this hatched area, the logical level of the protection output signal $S3_{UV}$ is "1". The protection area is defined by the electrical quantities $\ddot{IZ}_{kz}$ and kv.

The operation of the FIG. 17 embodiment will be described referring to the flow charts shown in FIGS. 19 and 20. In a step $E_{UV}$, the gain K of the variable gain circuit 10 is set to a value kz corresponding to a current compensation setting value. The switches in the selection circuit 5d are controlled according to step $D_{UV.OC}$ (FIG. 19), so that the switch SW1 is closed, while the switch SW2 is opened (hereinafter described referring to FIG. 20). In step $E_{UV}$, the sample value $e_x$ from the subtracter 8a in the comparing circuit 6 is made $\ddot{IZ}_{kz}$. In step G, the reference signal generating circuit 12 is controlled by a control signal S5 from MPU 7 to set the output reference signal $e_r$ to 0 V. In step B, MPU 7 reads the discriminated output signal S2 supplied from the comparing circuit 6 and representing the result of comparing the sample value $e_x$ ($=\ddot{IZ}_{kz}$) with the reference signal $e_r$ ($=0$ V). Step $D_{UV.OC}$ is different from step D in FIG. 5A, and will be described in detail, referring to FIG. 20.

Figure 19:
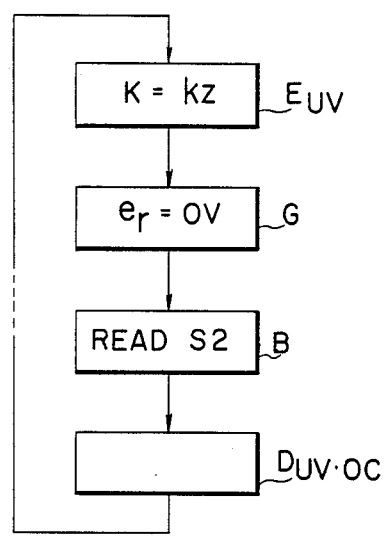
FIG. 19 shows a flow chart for explaining the operation of the embodiment shown in FIG. 17.
Figure 20:
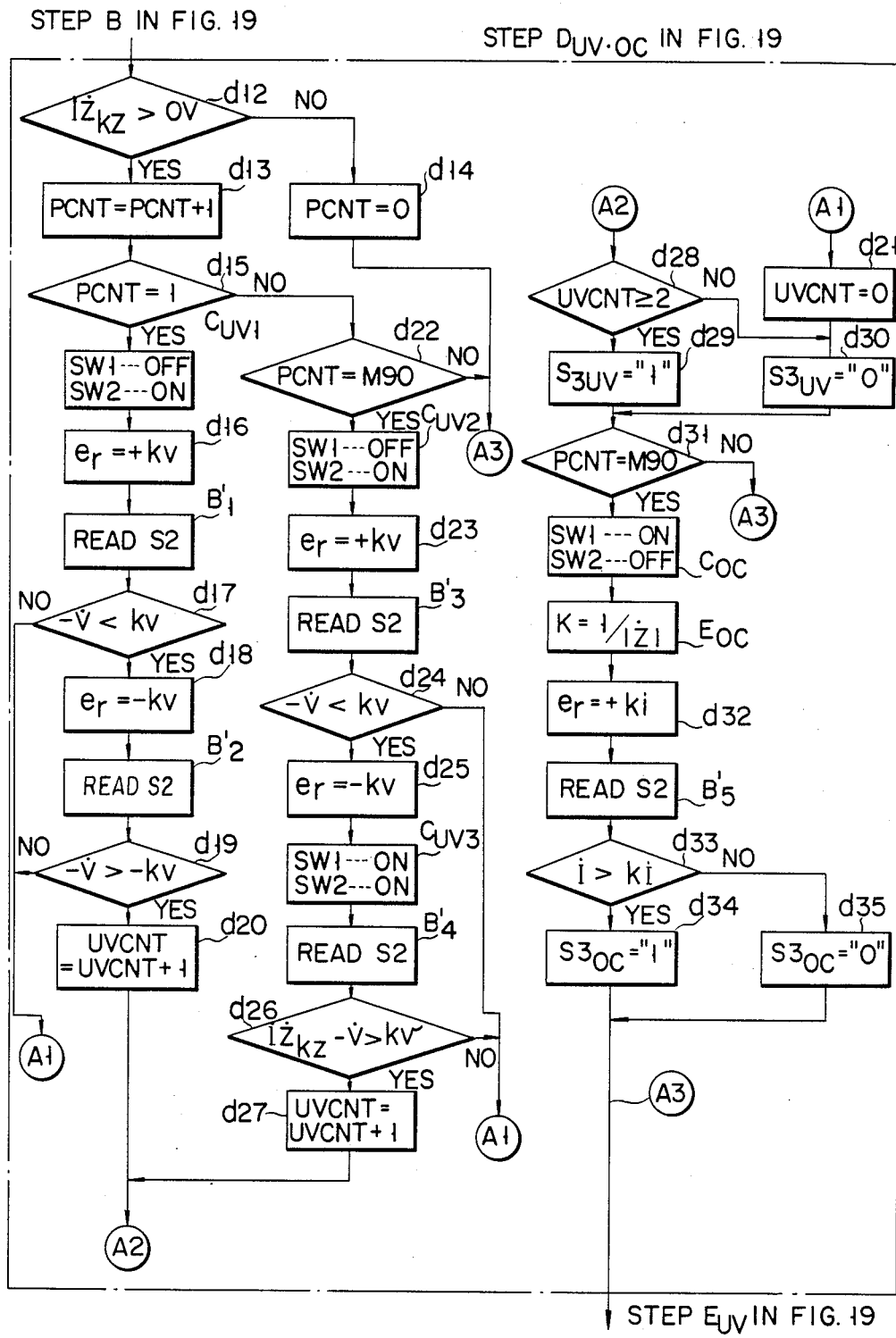
FIG. 20 shows a flow chart illustrating the details of a step $D_{UV.OC}$ in FIG. 19.

In FIG. 20, in step d12, the result of checking the polarity of the electrical quantity $\ddot{IZ}_{kz}$ applied to MPU 7 in step B of FIG. 19 is discriminated. If the polarity checked is positive, that is ($\ddot{IZ}_{kz} > 0$ V), the program advances to step d13. When it is negative or equal to zero (NO), the program branches to step d14. In step d14, the positive wave counter PCNT is set to zero, and the processing of step $D_{UV.OC}$ (FIG. 19) ends. In step d13, the positive wave counter PCNT is incremented and the program shifts to step d15. Here, the count value of the positive wave counter PCNT indicates a time period elapsed from the time point $t_0{}^+$ at which the polarity of the electrical quantity $\ddot{IZ}_{kz}$ changes from negative to positive. In step d15, it is discriminated whether the count of the counter PCNT is 1 or not. A count of 1 indicates that the electrical quantity $\ddot{IZ}_{kz}$ changed its polarity from negative to positive. In this case, the program processing shifts to step $C_{UV1}$ at a time point $t_0{}^+$ at which the condition in step d15 holds. In step $C_{UV1}$, the switch SW1 in the selection circuit 5d is opened, while the switch SW2 is closed. As a result, the sample value $e_x$ from the subtracter 8a in the comparing circuit 6 is $-\dot{V}$. In step d16, the reference signal generating circuit 12 is controlled by a control signal S5 from MPU 7 and produces a reference signal $e_r$ where $e_r = +kv$.

In step $B_1'$, the discriminated output signal $S2(t_0{}^+)_1$ from the comparing circuit 6 immediately after a time point $t_0{}^+$ referred to in step d15 is applied to MPU 7. In step d17, the result of comparing the sample value $e_x$ ($=-\dot{V}$) with the reference signal $e_r$ ($=kv$) is discriminated. In step d17, when $-\dot{V} < kv$, the program processing shifts to step d18 where the reference signal $e_r$ is set to $-kv$, i.e. $e_r = -kv$. Then, the program step shifts to step $B_2'$ and then to step d19. In these steps $B_2'$ and d19, as described in steps $B_1'$ and d17, the discriminated output signal $S2(t_0{}^+)_2$ from the comparing circuit 6 immediately after a time point $t_0{}^+$ is loaded into MPU 7 and the result of comparing the electrical quantity ($-\dot{V}$) with the electrical quantity ($-kv$) is discriminated.

The level of the discriminated output signal $S2(t_0{}^+)_2$ represents the result of the discrimination of the magnitude of the electrical quantity $[-\dot{V}(t_0{}^+)]$ of the electrical quantity $[-\dot{V}]$ immediately after the time point $t_0{}^+$ when the polarity of the electrical quantity $\ddot{IZ}_{kz}$ has been changed. That is, if $S2(t_0{}^+)_1 = $ "1", $-\dot{V}(t_0{}^+) > kv$, $$\text{if } S2(t_0{}^+)_1 = \text{"0"}, \; -\dot{V}(t_0{}^+) < kv \tag{1}$$

$$\text{if } S2(t_0{}^+)_2 = \text{"1"}, \; -\dot{V}(t_0{}^+) > -kv \tag{2}$$

$$\text{if } S2(t_0{}^+)_2 = \text{"0"}, \; -\dot{V}(t_0{}^+) < kv.$$

When the conditions $-\dot{V} < kv$ and $-\dot{V} > -kv$ in steps d17 and d19 are satisfied, that is, $S2(t_0{}^+)_1 = $ "0" and $S2(t_0{}^+)_2 = $ "1", the electrical quantity $\dot{V}$ lies between two lines parallel with the electrical quantity $\ddot{IZ}_{kz}$. Accordingly, when the above two conditions are satisfied, an under voltage relay operating counter UVCNT is counted up in step d20. On the other hand, when the conditions are not satisfied in step d17 or d19, the under voltage relay operating counter UVCNT is reset to zero in step d21.

When the condition in step d15 is NO, step d22 checks whether the count of the counter PCNT is equal to a numerical value $M_{90}$ corresponding to the time duration T90 which also corresponds to an electrical angle of 90°. The time point at which the condition of step d22 is YES is $(t_0{}^+ + T90)$. The time point $(t_0{}^+ + T90)$ is after the time duration T90 from the time point $t_0{}^+$ when the polarity of the electrical quantity $\ddot{IZ}_{kz}$ changed from negative to positive. When the condition in step d22 is YES, the program shifts its execution to step $C_{UV2}$ where the switch SW1 is opened and the switch SW2 is closed.

In step d23, the reference signal $e_r$ is again made equal to $+kv$, i.e. $e_r = +kv$. In step $B_3'$, MPU 7 reads the discriminated output signal $S2(t_0{}^+ + T90)_3$ from the comparing circuit 6 and in step d24, it is discriminated whether the condition $-\dot{V} < kv$ is YES or NO. The relationships between the logical levels of the discriminated output signal $S2(t_0{}^+ + T90)_3$, $-\dot{V}$ and kv are:

$$S2(t_0{}^+ + T90)_3 = \text{"1"} \text{ means that } -\dot{V}(t_0{}^+ + T90) > kv \tag{3}$$
$$S2(t_0{}^+ + T90)_3 = \text{"0"} \text{ means that } -\dot{V}(t_0{}^+ + T90) < kv$$

When the condition $-\dot{V} < kv$ is satisfied, step d24 is YES, that is, $S2(t_0{}^+ + T90) = $ "0" and the program advances in its execution to step d25 where the reference signal $e_r$ is made equal to $-kv$, i.e. $e_r = -kv$.

In step $C_{UV3}$, the switches SW1 and SW2 in the selection circuit 5d are closed. As a result, the sample value $e_x$ from the subtracter 8a is equal to the electrical quantity $(\ddot{IZ}_{kz} - \dot{V})$. In step $B_4'$, the discriminated output signal $S2(t_0{}^+ + T90)$ from the comparing circuit 6 is loaded into MPU 7, and in step d26 it is discriminated whether the condition $(\ddot{IZ}_{kz} - \dot{V}) > kv$ is YES or NO. The following conditions are indicated according to the logical levels of the discriminated output signal $S2(t_0{}^+ + T90)$:

$S2(t_0{}^+ + T90)_4 = $ "1" indicates that $$[\ddot{IZ}_{kz}(t_0{}^+ + T90) - \dot{V}(t_0{}^+ + T90)] > -kv \tag{4}$$

and $S2(t_0{}^+ + T90)_4 = $ "0" indicates that $$[\ddot{IZ}_{kz}(t_0{}^+ + T90) - \dot{V}(t_0{}^+ + T90)] < -kv.$$

Figure 18:
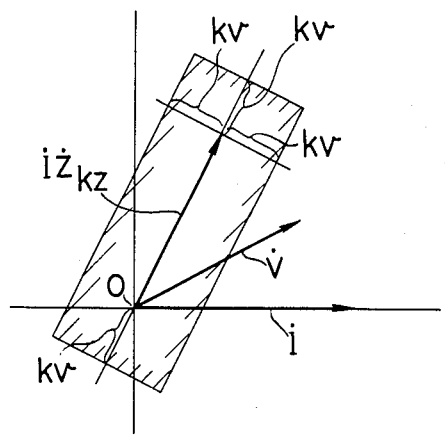
FIG. 18 shows a characteristic of the relay shown in FIG. 16.

When the conditions $-\dot{V}<kv$ and $(\dot{IZ}_{kz}-\dot{V})>kv$ are satisfied, steps d24 and d26 are YES, that is, $S2(t_0^+ + T90) = $ "0" and $S2(t_0^+ + T90)_4 = $ "1" and therefore the voltage vector $\dot{V}$ resides between two lines perpendicular to the electrical quantity $\dot{IZ}_{kz}$ in the characteristic diagram in FIG. 18. Accordingly, in step d27, an under voltage operating counter UVCNT is incremented. When the condition of step d24 or d26 is NO, the under voltage relay operation counter is reset to zero in step d21.

Following the completion of the processing in step d20 or d27, step d28 is executed. In step d28, the count of the under voltage operating counter UVCNT is discriminated. When the condition UNCNT≧2 illustrated in the step d28 is YES, all of the conditions of the equations (1) to (4) hold. Accordingly, in step d29, the level of the protection output signal $S3_{UV}$ (a protection output signal from the current compensating under voltage relay) is set to "1". When the condition in at least one of the steps d17, d19, d24 and d26 is NO, the logical level of the protection output signal $S3_{UV}$ is set to "0" in step d30. In this way, the protection output signal $S3_{UV}$ with the characteristic shown in FIG. 18 can be obtained.

After the completion of the processing of steps d29 and d30, step d31 and the subsequent ones are executed for producing a protection output signal $S3_{OC}$ as the protection output signal from the over current relay. In step $C_{OC}$, the switch SW1 in the selection circuit 5d is again closed, while the switch SW2 is opened, and then the program shifts to step $E_{OC}$ in its execution. In step $E_{OC}$, the gain K of the variable gain circuit 10 is set to $1/|Z|$. Through the execution of step $E_{OC}$, the sample value $e_x$ from the subtractor 8a in the comparing circuit 6 is equal to the electrical quantity I, i.e. $e_x = I$.

In step d32, the reference signal generating circuit 12 is controlled by a control signal S5 derived from MPU 7 for making the reference signal $e_r$ equal to $+ki$. In step $B_5'$, the discriminated output signal $S2(t_0^+ + T90)$ from the comparing circuit 6 is applied to MPU 7. In step d33, it is discriminated as to whether the condition $\dot{I}>ki$ holds or not. The time point of $(t_0^+ + T90)$ is slightly different from that of $(t_0^+ + T90)$ described in step d22, since the steps of the program are processed sequentially. However, these time points can be considered to be substantially concurrent in practice as program steps are executed at a high speed. Here, $S2(t_0^+ + T90)_5 = $ "1" indicates that $|I|>ki$, and $S2(t_0^+ + T90)_5 = $ "0" indicates that $|I|<ki$. Accordingly, when the condition in step d30 is such that, when the discriminated output signal $S2(t_0^+ + T90)_5$ is equal to "1", the level of the protection output signal $S3_{OC}$ (the protection output signal from the over current relay) is set to "1" in step d34. When the condition in step d33 is such that the discriminated output signal $S2(t_0^+ + T90)_5$ is equal to "0", the protection output signal $S3_{OC}$ is set to "0" in step d35. In this way, the protection output signal $S3_{OC}$ as the output signal from the overcurrent relay can be obtained.

In the above description, the electrical quantity $\dot{IZ}_{kz}$ changes from negative to positive. Also in the reverse case, the protection output signals $S3_{UV}$ and $S3_{OC}$ can be obtained by modifying the flow chart in FIG. 20.

Figure 21:
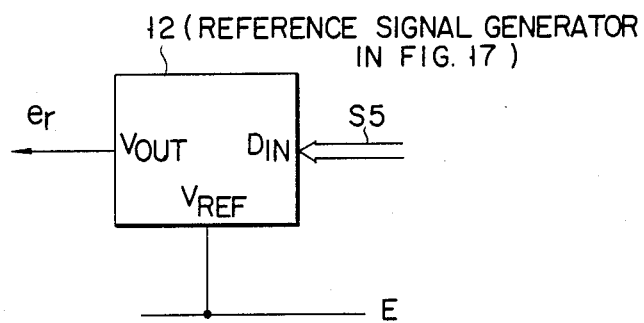
FIG. 21 is a block diagram of an embodiment of a reference signal generating circuit in FIG. 17.
Figure 22:
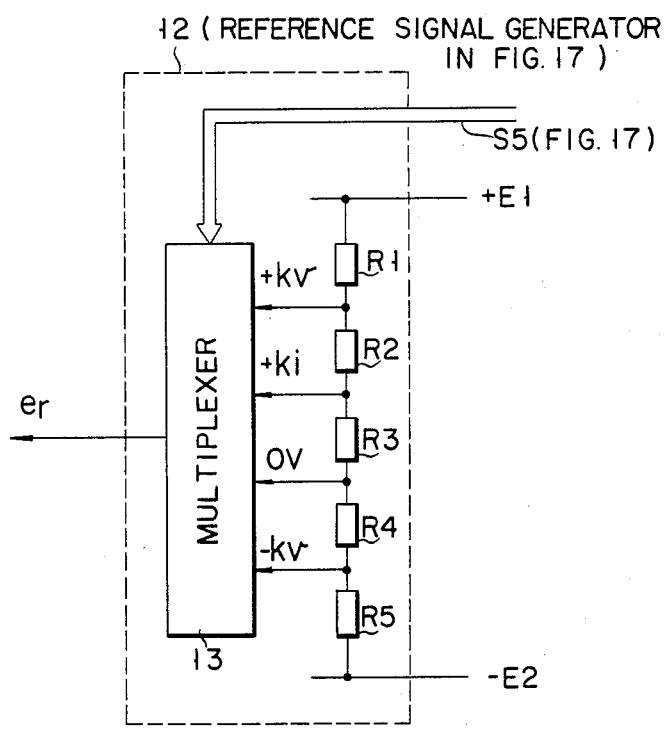
FIG. 22 is a block diagram of another embodiment of the reference signal generating circuit shown in FIG. 17.

FIGS. 21 and 22 show embodiments of the reference signal generating circuit 12 shown in FIG. 17, respectively. The reference signal generating circuit 12 in FIG. 21 makes use of a digital analog converter. In FIG. 21, electrical quantities $\pm kv$, ki and 0 V are produced as the reference signal $e_r$ from an output terminal $V_{OUT}$ when digital codes representing $\pm kv$, ki and 0 V are applied from MPU 7 to the digital input $D_{IN}$. Here, $\pm kv$ and ki are setting values of the protective relay system. The codes corresponding to $\pm kv$ and ki may be applied to the reference signal generating circuit 12 by means of a digital switch through MPU 7, or directly.

The reference signal generating circuit 12 shown in FIG. 22 divides a voltage between voltage sources $E+1$ and $-E2$ by means of a combination of resistors R1 to R5 for generating the reference signals $\pm kv$, ki and 0 V, and applies these reference signals to a known multiplexer which responds to a control signal S5 from MPU 7 to produce a given reference signal $e_r$ shown in FIG. 17.

In the embodiment shown in FIG. 17, the level of the reference signal $e_r$ from the reference signal generating circuit 12 is changed in a given step shown in FIG. 20. This approach can be used not only for obtaining the characteristic of the current compensating under voltage relay, but also for obtaining the characteristic of the distance relay in the embodiment shown in FIG. 4.

In the FIG. 4 embodiment, the reference signal $e_r$ is set at 0 V, neglecting the bias. In practice, however, the reference signal contains a slight bias voltage in order to prevent an undesirable operation of the relay system caused when the input electrical quantity or an AC quantity to the selection circuit shown in FIG. 4 is minute. This is illustrated by using the flow chart shown in FIG. 5B, if the given level 0 V in the step d5 is replaced by $-v_\epsilon$, a distance relay with such a bias voltage for preventing the above described undesirable operation can be obtained.

Alternatively, the reference signal 0 V in step d1 shown in FIG. 5B (see the details of the step D in FIG. 5A) is replaced by a reference signal with two positive and negative polarities $+v_\epsilon'$ and $-v_\epsilon'$. When $V_p > +v_{68}'$, the program may be shifted in its execution from step d1 to step d2. When $\dot{V}_p < -v_\epsilon'$, the program may jump from the step d1 to step d7.

Figure 23:
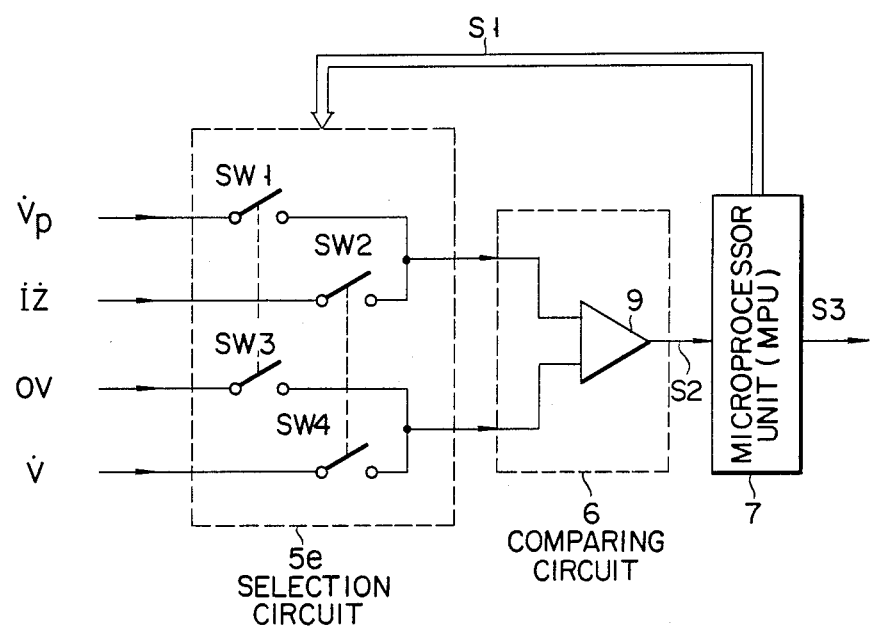
FIG. 23 is a block diagram of an eighth embodiment according to the present invention.

FIG. 23 shows an 8th embodiment of the present invention. In the embodiment shown in FIG. 17, the reference signal $e_r$ is directly applied to the level detector 9. This circuit arrangement, however, may be modified in various ways. In the FIG. 4 embodiment, for example, the polarity of the polarity voltage $\dot{V}_p$ is checked by comparing the polarity voltage $\dot{V}_p$ with the reference signal 0 V (in step d1 of FIG. 5B). The polarity of the electrical quantity $(\dot{IZ} - \dot{V})$ is checked by comparing the electrical quantity $(\dot{IZ} - \dot{V})$ with the reference signal of 0 V (steps d5 and d10 in FIG. 5B). This can also be realized by an embodiment of the present invention shown in FIG. 23.

In FIG. 23, the selection circuit 5e contains the switches SW1 and SW3, and the switches SW2 and SW4, which are respectively switched in an interlocking manner by a control signal S1 from MPU 7. Electrical quantities $\dot{V}_p$, $\dot{IZ}$, 0 V and $\dot{V}$ are correspondingly applied to the input terminals of the switches SW1 to SW4. The outputs of the switches SW1 and SW2, and the switches SW3 and SW4 are commonly connected, respectively. The outputs of the switches SW1 and SW2 and the output of the switches SW3 and SW4 are applied to the input terminals of the level detector 9. The other arrangement, except for the selection circuit 5e and the comparing circuit 6, is substantially the same as those of FIG. 4.

In FIG. 23, the selection circuit 5e, when detecting the polarity of polarity voltage $\dot{V}_p$, is so controlled that the switches SW1 and SW3 are closed and the switches SW2 and SW4 are opened (corresponding to step A in FIG. 5A). In accordance with the controlled state, the input signals to the level detector 9 are the polarity voltage $\dot{V}_p$ and 0 V. The detector 9 detects the polarity of the polarity voltage $V_p$. The result of the detection is fed to MPU 7 according to the level of the discriminated output signal S2 (FIG. 5A, step B). In the step corresponding to step C in FIG. 5A, the switches SW2 and SW4 are closed, while the switches SW1 and SW3 are opened. In this step, the input signals to the level detector 9 are electrical quantities $\dot{IZ}$ and $\dot{V}$. These inputs are compared at a time point $(t_0^{\pm} + T90)$ (FIG. 6). The comparing result representing that $\dot{IZ} > \dot{V}$ or $\dot{IZ} < \dot{V}$, i.e. $(\dot{IZ} - \dot{V}) < > 0$, is applied to MPU 7 as a discriminated output signal S2 with a logical level. MPU 7 determines the level of the protection output signal S3 according to the level of the discriminated output signal S2.

In the above-mentioned embodiments, the application of the discriminated output signal S2 from the comparing circuit 6 to MPU 7 and the discrimination of the polarity of the discriminated output signal S2 (step B in FIG. 5A and steps d5 and d10 in FIG. 5B) are each allowed to be performed one time. However, the application and discrimination are not limited by one time. Alternatively, the protection output signal S3="1" may be produced when the conditions shown in steps d5 and d10 in FIG. 5B are YES two consecutive times. In this case, when monotonous noise is applied to the relay systems or the AC input quantity suffers from distortion, erroneous discrimination of the relay system can be prevented.

In the embodiment shown in FIG. 4, the wave counters PCNT and NCNT are used for detecting a time point $(t_0^+ + T90)$ upon lapse of the given time after the polarity of the polarity voltage $\dot{V}_p$ has been changed (FIG. 5B). And, the program execution shown in FIGS. 5A and 5B is conducted periodically with a constant time period. That is, the processing shown in FIGS. 5A and 5B are executed $M_{90}$ times. However, the periodical execution of the program is not necessarily required in the present invention. The detection of the time point $(t_0^+ + T90)$ may be performed by using a timer counter provided outside MPU 7. The time point of $(t_0^+ + T90)$ can also be detected by using an internal counter which may be provided within MPU 7 and is operated independently of the program execution. In this case, the change of the polarity of the polarity voltage $\dot{V}_p$ can be detected when, in step B of FIG. 5A, the product of the discriminated output signal S2 representing the polarity of the polarity voltage $\dot{V}_p$ previously read by MPU 7 and the discriminated output signal S2 representing the polarity of the polarity voltage $\dot{V}_p$ most recently read by MPU becomes negative. The counter provided outside MPU 7 or provided within MPU 7 may be driven in response to the negative condition of the above-mentioned product.

In the above-mentioned embodiments, the program to realize the characteristic of a given relay is executed in MPU 7. However, another program such as an automatic monitoring program may be contained in MPU 7.

In a further modification, in the flow chart of FIG. 12 for illustrating the 4th embodiment in FIG. 10, the program may be advanced to the step $A_0$, only when the protection output signal $S3_{SU}$ is "1". In other situations, the program may be shifted to the step $E_{OM}$. Removing the program processing not required in a normal state does not limit the present invention in any way.

What we claim is:

1. A protective relay system comprising:
   selection circuit means for receiving a plurality of input signals different one from another in kind which are supplied from a power system to be protected by said protective relay system and for producing output signals selected from said input signals;
   comparing means connected to said selection circuit means for receiving said output signals to discriminate whether said output signal is within a predetermined range or not, and to produce at least one discriminated output signal in response to said discrimination; and
   data processing means connected to said comparing means for receiving said discriminated output signal to generate at least one protection output signal;
   said data processing means including means for controlling said selection circuit means, to time-sequentially alter said output signals from said selection circuit means, means for reading said discriminated output signal from said comparing means in response to a controlled state of said selection circuit means, and means for determining a logical level of said protection output signal in response to a logical level of a second discriminated output signal from said comparing means corresponding to a second controlled state different from a first controlled state of said selection circuit means, and said second discriminated output signal being produced upon lapse of a predetermined time after a logical level of a first discriminated output signal, from said comparing means corresponding to said first controlled state of said selection circuit means, has been changed.

2. A protective relay system according to claim 1, wherein said predetermined time corresponds to an electrical angle of 90° of an input signal to said selection circuit means.

3. A protective relay system according to claim 1, wherein said predetermined time corresponds to an electrical angle of 75° of an input signal to said selection circuit means.

4. A protective relay system according to claim 1, wherein said selection circuit means includes first, second and third switches of which the switchings are controlled in accordance with a selection signal from said data processing means, an input signal having an electrical quantity $\dot{IZ}$ (the product of a line current $\dot{I}$ of a single phase power system and a line impedance $\dot{Z}$ of the power system) being applied to said first switch, an input signal having an electrical quantity $\dot{V}$ (the line voltage of said power system) being applied to said second switch, and an input signal having an electrical quantity $\dot{V}_p$ (the polarity voltage obtained from said electrical quantity $\dot{V}$) being applied to said third switch; and
   said comparing means includes an adder/subtracter for adding and subtracting the outputs of said first, second and third switches and a level detector means connected to the output of said adder/subtracter for comparing the output signal of said adder/subtracter with a given reference signal whereby a discriminated output signal with a logical level corresponding to the result of the comparison is applied to said data processing means.

5. A protective relay system according to claim 1, wherein said selection circuit means comprises first, second and third switching means each including three switches of which the switchings are controlled by a selection signal from said data processing means, said first switching means receiving input signals having electrical quantities $I\dot{Z}_a$, $I\dot{Z}_b$ and $I\dot{Z}_c$ ($I\dot{Z}_a$ is a product of a phase line current $I$ of a three phase power system and a line impedance $Z_a$ of the a phase: $IZ_b$ and $I\dot{Z}_c$ are products of b and c phase line currents $I$ and line impedances $\dot{Z}$ of b and c phases, respectively), said second switching means receiving input signals having electrical quantities $\dot{V}_a$, $\dot{V}_b$ and $\dot{V}_c$ (each is a line voltage of a corresponding phase), and said third switching means receiving input signals having electrical quantities $\dot{V}_{pa}$, $\dot{V}_{pb}$ and $\dot{V}_{pc}$ (each is a polarity voltage of a corresponding phase); and said comparing means comprises an adder/subtracter for adding and subtracting the outputs of said first, second and third switching means, and a level detector means connected to the output of said adder/subtracter for comparing the output signal of said adder/subtracter with a given reference signal whereby a discriminated output signal with a logical level corresponding to the result of the comparison is applied to said data processing means.

6. A protective relay system according to claim 1, wherein said selection circuit means comprises first, second and third switching means each including three switches of which the switchings are controlled according to a selection signal from said data processing means, said first switching means receiving input signals having electrical quantities $I\dot{Z}_a$, $I\dot{Z}_b$ and $IZ_c$ ($IZ_a$ is a product of a phase line current $I$ of a three phase power system and a line impedance $Z_a$ of the a phase: $I\dot{Z}_b$ and $I\dot{Z}_c$ are products of b and c phase line currents $I$ and line impedances $Z$ of b and c phases, respectively), said second switching means receiving input signals having electrical quantities $\dot{V}_a$, $\dot{V}_b$ and $\dot{V}_c$ (each is a line voltage of a corresponding phase), and said third switching means receiving input signals having electrical quantities $\dot{V}_{pa}$, $\dot{V}_{pb}$ and $\dot{V}_{pc}$ (each is a polarity voltage of a corresponding phase); and said comparing means includes a first comparing circuit having a subtracter connected to the outputs of said first and second switching means for subtracting the output signal of said second switching means from the output signal of said first switching means, and a level detector means connected to the output of said subtracter for comparing the output signal of said subtracter with a first reference signal whereby a first discriminated output signal with a logical level corresponding to the result of the comparison is applied to said data processing means, and a second comparing circuit connected to the output of said third switching means for comparing the output signal of said third switching means with a second reference signal whereby a second discriminated output signal with a logical level according to the result of the comparison is applied to said data processing means.

7. A protective relay system according to claim 1, wherein said selection circuit means includes first, second, third and fourth switches of which the switchings are controlled by a selection signal from said data processing means, an input signal having an electrical quantity $\dot{V}_p$ (the polarity voltage of the single phase-power system) being applied to said first switch, an input signal having an electrical quantity $I\dot{Z}$ (the product of the line current $I$ of the single phase power system and a line impedance $\dot{Z}$ of said power system) being applied to said second switch, an input signal having an electrical quantity of 0 V being applied to said third switch, an input signal having an electrical quantity V (the line voltage of said power system) being applied to said fourth switch, and said first and third switches and said second and fourth switches being interlocked for being simultaneously switched, respectively; and said comparing means includes a comparing circuit having a level detector connected to said selection circuit means for comparing a first output signal from the common output terminal of said first and second switches with a second output signal from the common output terminal of said third and fourth switches whereby a discriminated output signal with a logical level according to the result of the comparison is applied to said data processing means.

8. A protective relay system comprising:

selection circuit means for receiving a plurality of input signals different from one another in kind which are supplied from a power system to be protected by said protective relay system and for producing output signals selected from said input signals;

a variable gain circuit means for receiving an input signal having an electrical quantity different from each of said input signals supplied to said selection circuit means and for changing the gain of said received input signal;

comparing means connected to said selection circuit means for receiving an output signal from said selection circuit means and an output signal from said variable gain circuit means, for discriminating whether at least one output signal from said selection circuit means and said variable gain circuit means is within a predetermined range or not, and for producing at least one discriminated output signal as a result of said discrimination; and data processing means connected to said comparing means for receiving said discriminated output signal from said comparing means to produce at least one protection output signal, said data processing means including means for controlling said selection circuit means and said variable gain circuit means, to time-sequentially alter output signals from said selection circuit means and the gain of said variable gain circuit means, means for reading said discriminated output signal from said comparing means in response to controlled states of said selection circuit means and said variable gain circuit means, and means for determining a logical level of said protection output signal according to a logical level of a second discriminated output signal of said comparing means corresponding to a second controlled state different from a first controlled state of said selection circuit means and said variable gain circuit means, said second discriminated output signal being produced upon lapse of a predetermined time after a logical level of a first discriminated output signal from said comparing means, corresponding to a first controlled state of said selection circuit means and said variable gain circuit means, has been changed.

9. A protective relay system according to claim 8, wherein said selection circuit means includes first and second switches of which the switchings are controlled by the selection signal from said data processing means, an input signal having an electrical quantity $I\dot{Z}$ (the product of a line current $I$ of a single phase power system and a line impedance $\dot{Z}$ of the same power system) being applied to said first switch, an input signal having an electrical quantity $\dot{V}_p$ (the polarity voltage of said single phase power system) being applied to said second switch, an input signal having an electrical quantity $\dot{V}$ (line voltage of said single phase power system) being applied to said variable gain circuit means of which the gain is controlled by a control signal from said data processing means; and said comparing means includes an adder/subtracter connected to the outputs of said first and second switches and said variable gain circuit means for making an addition and subtraction between the output signals of said first and second switches and an output signal of said variable gain circuit means, and a level detector connected to the output of said adder/subtracter for comparing an output signal of said adder/subtracter with a given reference signal whereby a discriminated output signal with a logical level according to the result of the comparison is applied to said data processing means.

10. A protective relay system comprising:
selection circuit means for receiving a plurality of input signals different one from another in kind which are supplied from a power system to be protected by said protective relay system and for producing output signals selected from said input signals;
a variable gain circuit means connected to said selection circuit means for receiving a selected output signal from said selection circuit means and for changing the gain of said selected output signal;
comparing means connected to said selection circuit means and said variable gain circuit means for receiving the output signal from said variable gain circuit means and at least one input signal other than the input signal to said variable gain circuit means, for discriminating if one of the output signals from said selection circuit means and said variable gain circuit means is within a predetermined range, and for producing at least one discriminated output signal according to the result of said discrimination; and
data processing means connected to the output of said comparing means for receiving said discriminated output signal from said comparing means to produce at least one protection output signal,
said data processing means includes means for controlling said selection circuit means and said variable gain circuit means, to time-sequentially alter the output signals from said selection circuit means and the gain of said variable gain circuit means, means for reading said discriminated output signal from said comparing means in response to controlled states of said selection circuit means and said variable gain circuit means, and means for determining a logical level of said protection output signal by a logical level of a second discriminated output signal from said comparing means corresponding to a second controlled state different from a first controlled state of said selection circuit means and said variable gain circuit means, said second discriminated output signal being produced upon lapse of a predetermined time after a logical level of a first discriminated output signal corresponding to said first controlled state of said selection circuit means and said variable gain circuit means has been changed.

11. A protective relay system according to claim 10, wherein said selection circuit means includes first, second and third switching means each having three switches of which the switchings are controlled according to a selection signal from said data processing means, input signals having electrical quantities $I\dot{Z}_a$, $I\dot{Z}_b$ and $I\dot{Z}_c$ (the products of a, b and c phase line current $I$ in a three phase power system and the impedances $\dot{Z}a$, $\dot{Z}_b$ and $\dot{Z}_c$ of the corresponding lines) being applied to said first switching means, input signals having electrical quantities a, b and c phase line voltages $\dot{V}_a$, $\dot{V}_b$ and $\dot{V}_c$ being applied to said second switching means, input signals having electrical quantities a, b and c phase polarity voltages $\dot{V}_{pa}$, $\dot{V}_{pb}$ and $\dot{V}_{pc}$ being applied to said third switching means;

an output signal from said second switching means is applied to said variable gain circuit means and the gain of said variable circuit means is controlled by a control signal from said data processing means; and said comparing means includes an adder/subtracter connected to the outputs of said first and third switching means and the output of said variable gain circuit means for making an addition and subtraction between the output signals from said first and third switching means and the output signal from said variable gain circuit means, and a level detector connected to the output of said adder/subtracter for comparing the output signal of said adder/subtracter with a reference signal whereby a discriminated output signal with a logical level according to the result of the comparison is applied to said data processing means.

12. A protective relay system according to claim 10, wherein said selection circuit means includes first and second switches controlled by a selection signal from said data processing means, an input signal having electrical quantity $I\dot{Z}$ (the product of a line current $I$ of a single phase power system and a line impedance $\dot{Z}$ of the same power system) being applied to said first switch and an input signal having electrical quantity $\dot{V}$ (line voltage of said single power system) being applied to said second switch;

said variable gain circuit means is controlled by a control signal from said data processing means to control a gain of an output signal from said first switch and to apply the output signal of said variable gain circuit means to said comparing means; and said comparing means includes a subtracter circuit connected to the outputs of said variable gain circuit means and said second switch for subtracting the output signal of said second switch from the output signal of said variable gain circuit means, and a level detector connected to the output of said subtracter circuit and a reference signal generator controlled by said data processing means for comparing the output signal from said subtracter circuit with a given reference signal from said reference signal generator for providing said discriminated output signal with a logical level resulted from said comparison to said data processing means.

13. A protective relay system comprising:
a selection circuit means for receiving first, second and third input signals which are supplied from a power system to be protected by said protective relay system and for producing, from a common connection point, output signals selected from said input signals;
a holding circuit circuit connected to said common connection point for receiving said first output signal through said common connection point to hold said first output signal for a given time duration;
comparing means connected to said common connection point, the output of said holding circuit and a reference signal source for comparing a level of said second output signal with said reference signal (containing zero) when said comparing means receives said second output signal through said common connection point to produce a first discriminated output signal, and for comparing a difference level between said third output signal and an output signal from said holding circuit to produce a second discriminated output signal; and
data processing means connected to said comparing means for receiving said discriminated output signals from said comparing means to generate at least one protection output signal,
said data processing means including means for controlling said selection circuit means, to time-sequentially alter output signals from said selection circuit means, means for reading said discriminated output signals from said comparing means and means for determining a logical level of said protection output signal according to the level of said second discriminated output signal, said second discriminated output signal being produced upon lapse of a predetermined time after a logical level of said first discriminated output signal has been changed.

14. A protective relay system according to claim 13, wherein said selection circuit means includes first, second and third switching means each having three switches of which the switchings are controlled by a selection signal from said data processing means, said third input signal having electrical quantities $I\dot{Z}_a$, $I\dot{Z}_b$ and $I\dot{Z}_c$ (the products of a, b and c phase line currents I of the three phase power system and the corresponding line impedance $\dot{Z}_a$, $\dot{Z}_b$ and $\dot{Z}_c$) being applied to said first switching means, said first input signal having electrical quantities $\dot{V}_a$, $\dot{V}_b$ and $\dot{V}_c$ (a, b and c phase line voltages of said three phase power system) being applied to said second switching means, said second input signal having electrical quantities $\ddot{V}_{pa}$, $\ddot{V}_{pb}$ and $\ddot{V}_{pc}$ (the polarity voltages of a, b and c phases) being applied to said third switching means, the output terminals of said first, second and third switching means being connected together;
said holding circuit holds said first output signal for a given time period according to a control signal from said data processing means; and
said comparing means includes a subtracter circuit connected at one end to said common connection point of said selection circuit means and at the other end to the output terminal of said holding circuit, and a level detector connected to the output of said subtracter at one input and to said reference signal source at the other input for comparing a level of the output signal of said subtracter circuit with that of said reference signal whereby said discriminated output signals are applied to said data processing means, in which when said second output signal having electrical quantities $V_{pa}$, $V_{pb}$ and $V_{pc}$ is applied to said subtracter, said level detector produces said first discriminated output signal on the basis of the result of the comparison of said second output signal with said reference signal, and when said third output signal having electrical quantities $I\dot{Z}_a$, $I\dot{Z}_b$ and $IZ_c$ is applied to said subtracter circuit, said first output signal having electrical quantities $\dot{V}_a$, $\dot{V}_b$ and $\dot{V}_c$ as an output signal from said holding circuit is subtracted from said third output signal having electrical quantities $I\ddot{Z}_a$, $IZ_b$ and $I\ddot{Z}_c$, so that said level detector produces said second discriminated output signal.

* * * * *